United States Patent [19]

Reboh et al.

[11] Patent Number: 4,866,634

[45] Date of Patent: Sep. 12, 1989

[54] DATA-DRIVEN, FUNCTIONAL EXPERT SYSTEM SHELL

[75] Inventors: René Reboh, Palo Alto; Tore J. M. Risch, Menlo Park, both of Calif.

[73] Assignee: Syntelligence, Sunnyvale, Calif.

[21] Appl. No.: 84,252

[22] Filed: Aug. 10, 1987

[51] Int. Cl.⁴ ............................................. G06F 15/18
[52] U.S. Cl. .................................... 364/513; 364/900; 364/408
[58] Field of Search ........................ 364/513, 408, 900

[56] References Cited

U.S. PATENT DOCUMENTS

| | | | |
|---|---|---|---|
| 4,642,782 | 2/1987 | Kemper et al. | 364/550 |
| 4,648,044 | 3/1987 | Hardy et al. | 364/513 |
| 4,752,889 | 6/1988 | Rappaport et al. | 364/513 |
| 4,763,277 | 8/1988 | Ashford et al. | 364/513 |

FOREIGN PATENT DOCUMENTS

86/00156   1/1986  World Int. Prop. O. .......... 364/513

OTHER PUBLICATIONS

William van Melle, "The Structure of the MYCIN System", in B. G. Buchanan and E. H. Shortliffe, eds., *Rule-Based Expert Systems*, pp. 67-77, (Addison-Wesley, Reading, Mass., 1984).
Edward H. Shortliffe, "Details of the Consultation System", in B. G. Buchanan and E. H. Shortliffe, eds., *Rule-Based Expert Systems*, pp. 78-132 (Addison-Wesley, Reading, Mass., 1984).
Edward H. Shortliffe et al., "ONCOCIN: An Expert System for Oncology Protocol Management", *Proc. Seventh International Joint Conference on Artificial Intelligence*, pp. 876-881 (University of British Columbia, Vancouver, British Columbia, Aug. 1981).
Richard O. Duda and Rene' Reboh, "AI and Decision Making: The PROSPECTOR Experience", in Walter Reitman, ed., *Artificial Intelliegence Applications for Business*, pp. 111-147 (Ablex Publishing Corp., Norwood, N.J., 1984).
*1-2-3 Reference Manual*, Lotus Development Corporation, 55 Cambridge Parkway, Cambridge, Mass (1985).
PREDICT! Trial Pack, Product Manual, Unison Technology, Inc., 410 Rouser Road, Building One, Coraopolis, Pa., 15108 (1986).
GURU-Artificial Intelligence That Means Business, Business Brochure, Micro Data Base Systems, Inc., Lafayette, Ind., (1986).
Peter M. D. Gray, "The Functional Data Model", in *Logic, Algebra and Databases* (Ellis Horwood, Ltd., Chichester, England, 1984).
Carlo Zaniolo et al., "Object-Oriented Database Systems and Knowledge Systems", in Larry Kerschberg, ed., *Expert Database Systems*, pp. 50-65 (Benjamin/Cummings, Menlo Park, Calif. 1986).

(List continued on next page.)

*Primary Examiner*—A. D. Pellinen
*Assistant Examiner*—H. L. Williams
*Attorney, Agent, or Firm*—Townsend and Townsend

[57] ABSTRACT

An expert system shell efficiently computes functions of variables in response to numeric or symbolic data values input by a user. The system comprises a Knowledge Base in the form of a network of functions, an Inference Engine for efficiently updating values in the knowledge base in response to changes in entered data, and a Forms System that manages interaction with the user. A knowledge engineer creates the network of functions, and defines the user screens and the connection between screen objects and variables in the function network. The system allows many different types of variables, including numeric and symbolic types. The system associates a probability distribution with every variable, and computes the probability distributions for the dependent variables from the probability distributions for the independent variables. A variable can store multiple values as tables of probability distributions keyed by one or more key variables. When a user action changes the probability distributions for any variable, the system automatically maintains the specified functional relationships among all the related variables.

31 Claims, 20 Drawing Sheets

OTHER PUBLICATIONS

Michael Stonebreaker, Eric Hanson and Chin-Heng Hong, "The Design of the POSTGRES Rules System", in Michael Stonebreaker and Lawrence A. Rowe, eds., The POSTGRES Papers, Memorandum No. UCB/ERL M86/85, Electronics Research Laboratory, University of California, Berkeley, Calif. (Nov. 1986).

"The OPS5 Programming Language", in Lee Brownston, Robert Farrell, Elaine Kant and Nancy Martin, *Programming Expert Systems in OPS5*, (Addison-Wesley, Reading, Mass., 1985).

"System W", in James Martin, *Fourth-Generation Languages*, vol. II, pp. 429–452 (Prentice Hall, Englewood Cliffs, N.J., 1986).

Peter Lucas and Tore Risch, "Representation of Factual Information by Equations and Their Evaluation", *Proc. Sixth International Conference on Software Engineering*, pp. 367–376, Tokyo, Japan (Sep. 1982).

William B. Ackerman, "Data Flow Languages", *IEEE Computer*, pp. 15–24 (Feb. 1982).

William W. Wadge and Edward A. Ashcroft, *Lucid, The Dataflow Programming Language* (Academic Press, N.Y., 1985).

Kurt W. Piersol, "Object Oriented Spreadsheets: The Analytic Spreadsheet Package", *OOPSLA '86 Proceedings*, pp. 385–390 (Sep. 1986).

Rene Reboh and Tore Risch, "Syntel TM : Knowledge Programming Using Functional Representations", *Knowledge Representation;* published Aug. 10, 1986, pp. 1003–1007.

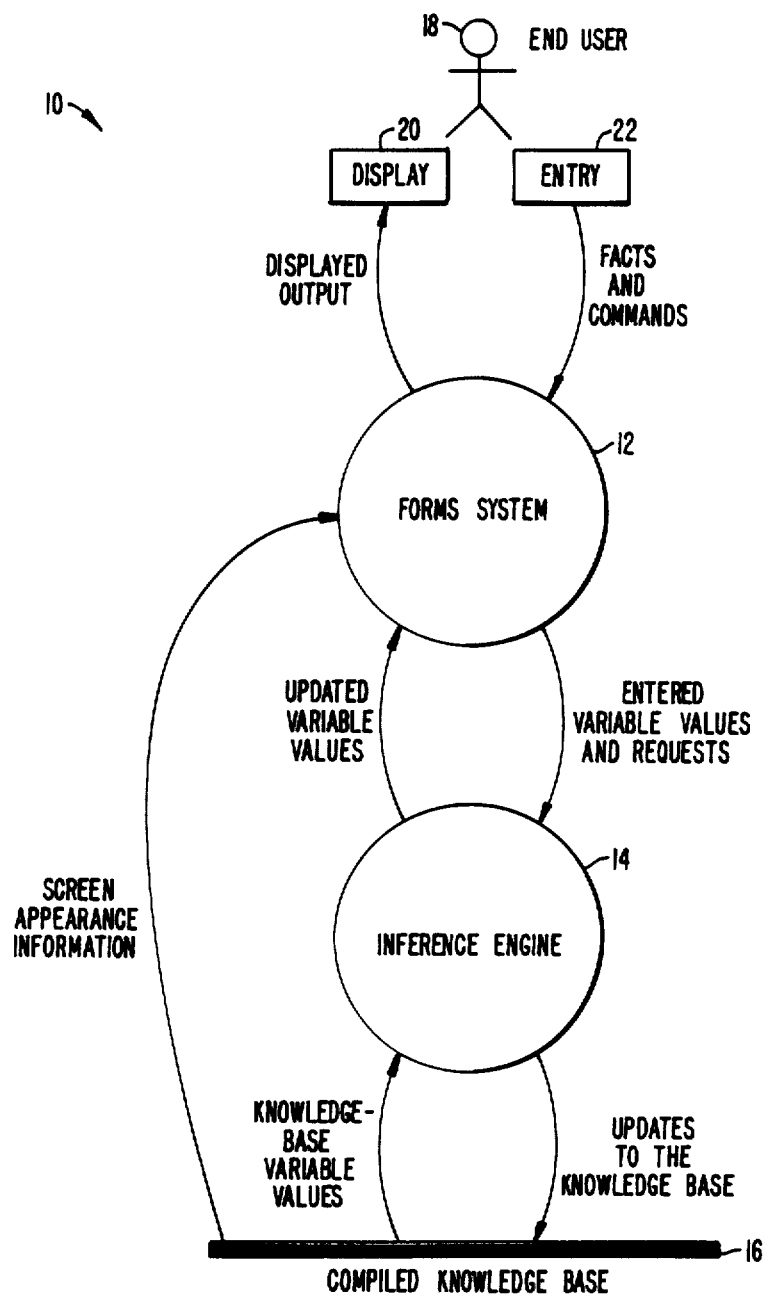
FIG._1.

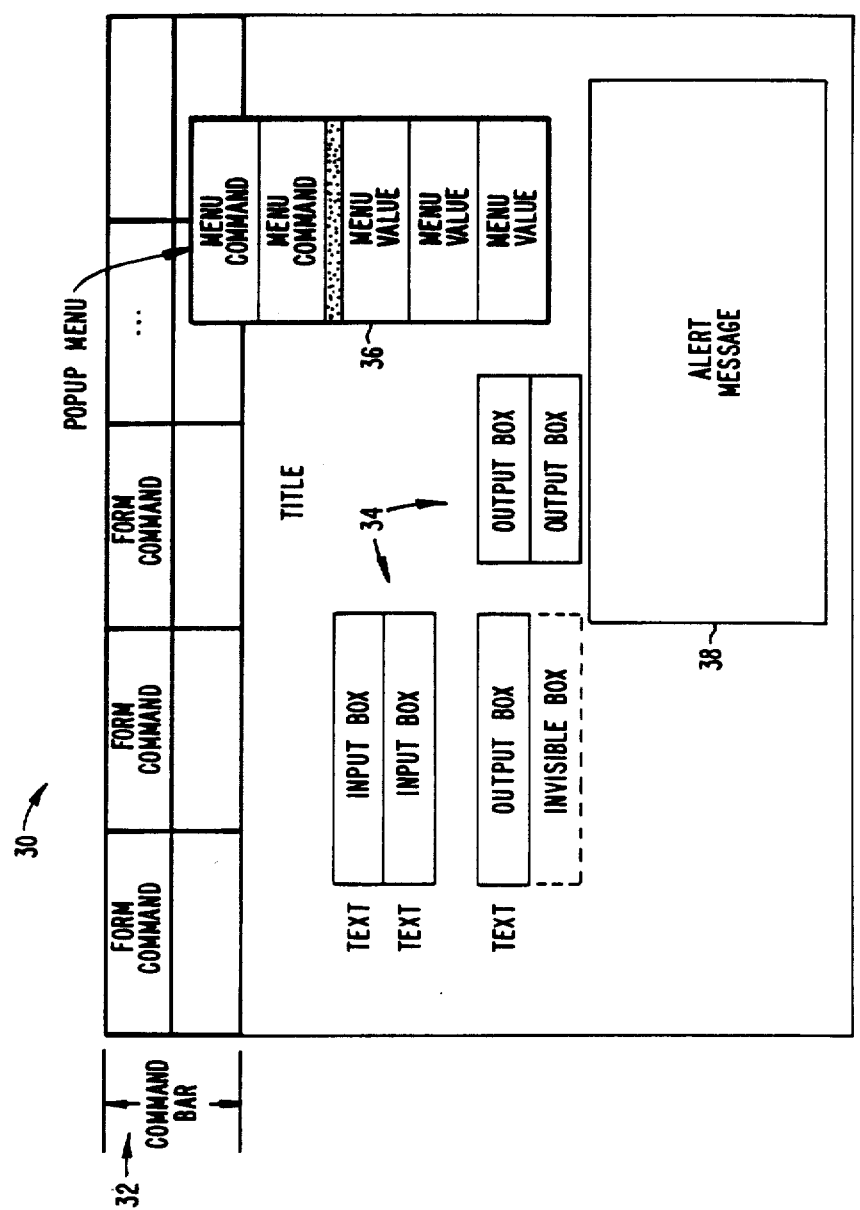
FIG._2.

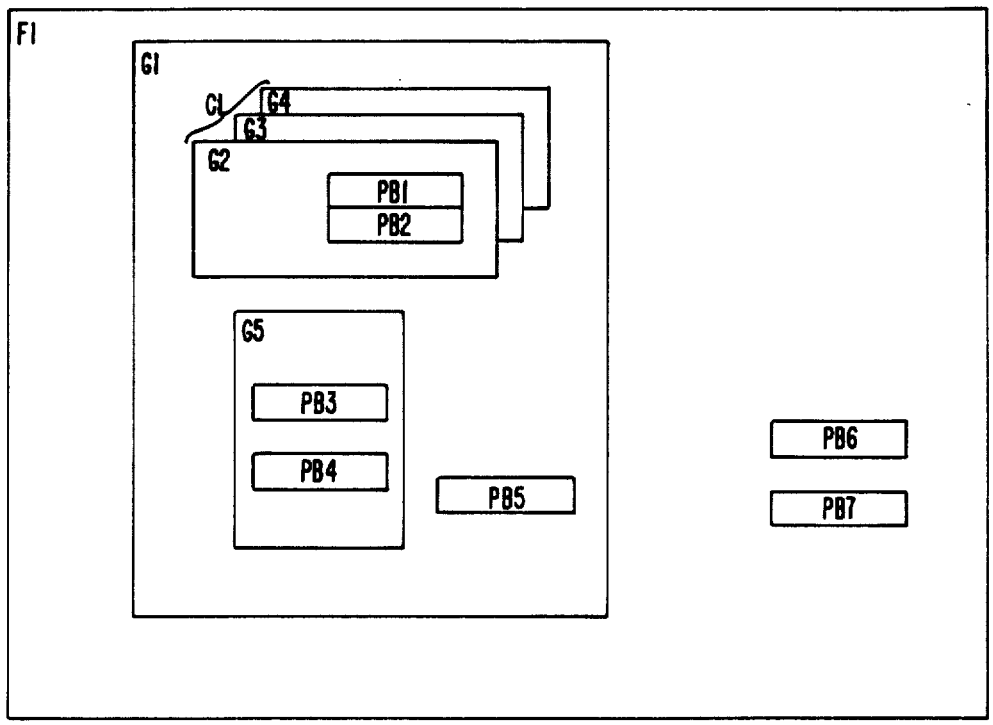
FORM F1 CONTAINS GROUP OBJECT G1 AND PRIMITIVE BOXES PB6 AND PB7
  GROUP OBJECT G1 CONTAINS CASE OBJECT C1, GROUP OBJECT G5, AND PRIMITIVE BOX PB5
    CASE OBJECT C1 CONTAINS THE ALTERNATIVE GROUPS G2, G3 AND G4
    GROUP OBJECT G2 CONTAINS PRIMITIVE BOXES PB1 AND PB2
  GROUP OBJECT G5 CONTAINS PRIMITIVE BOXES PB3 AND PB4
FIG._3.

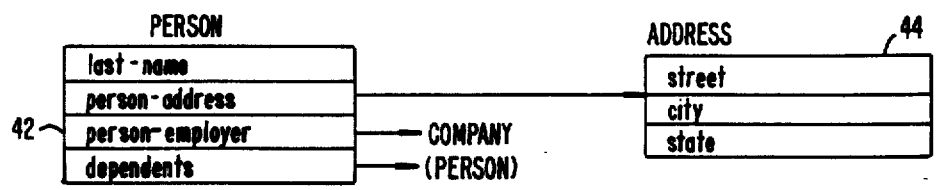
FIG._4.
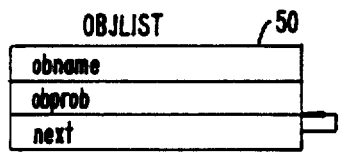
FIG._5.
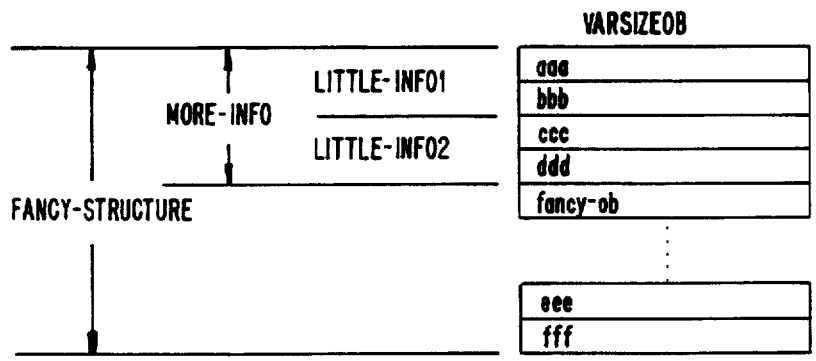
FIG._6.
FIG._7.

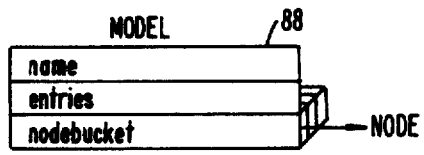
FIG._8A.
FIG._8C.
FIG._8B.

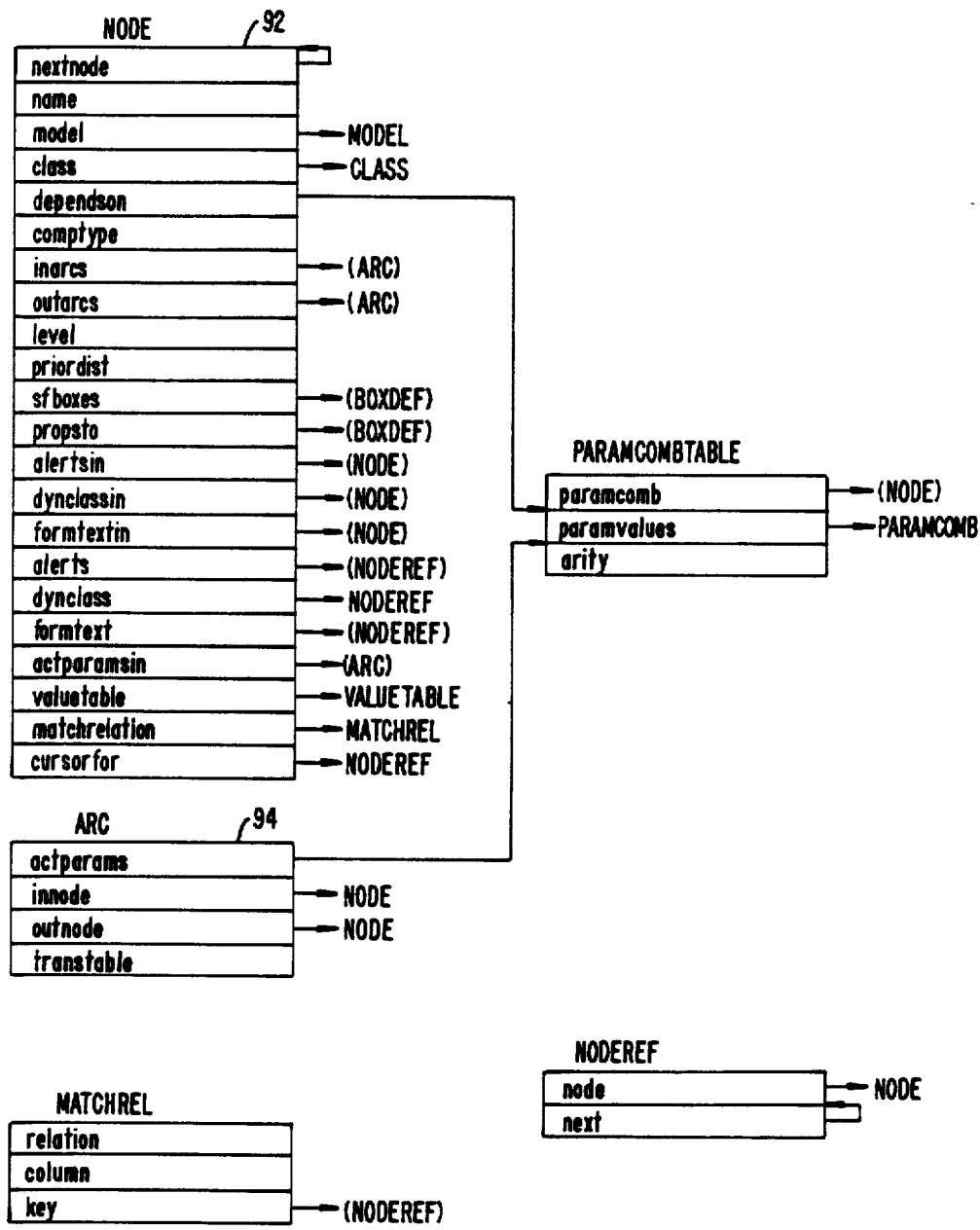
FIG._9.

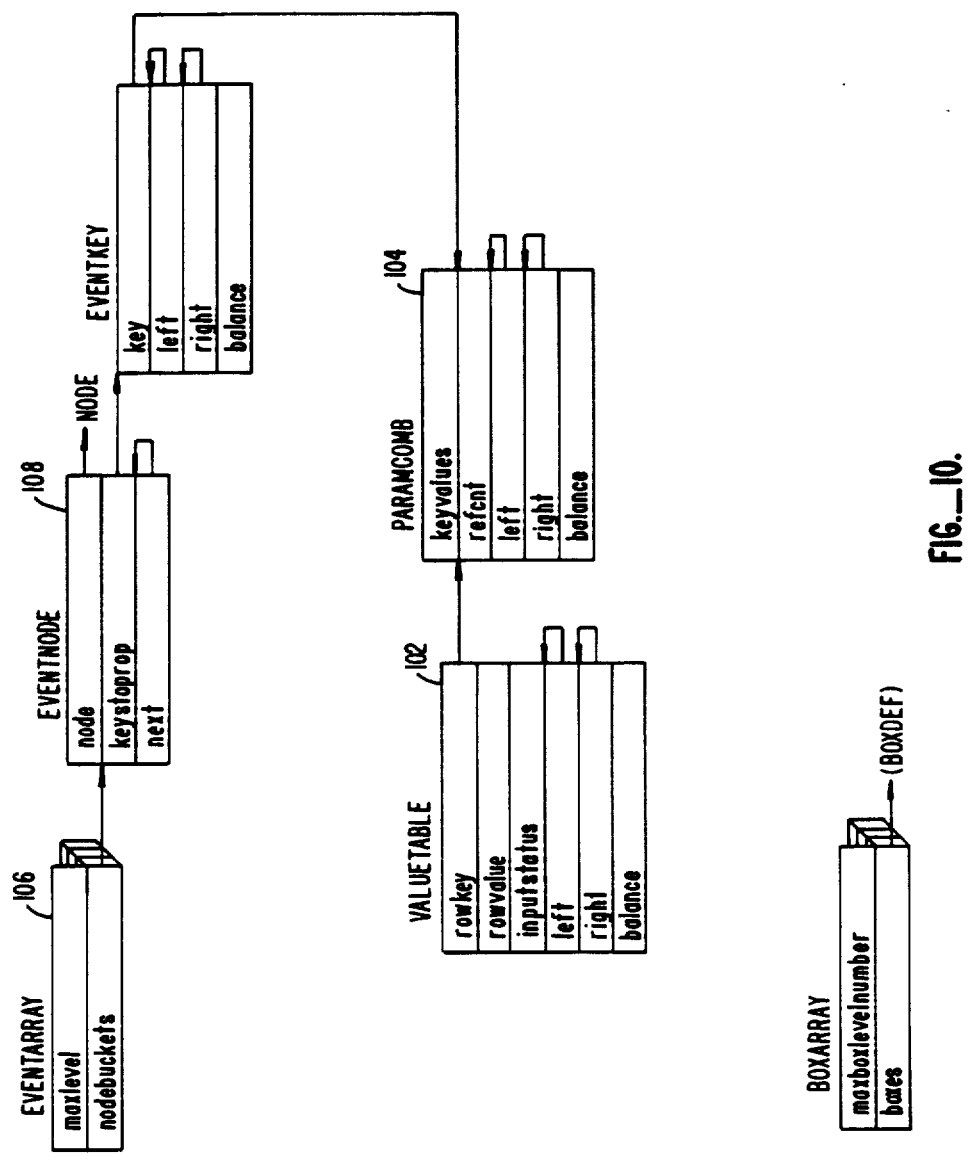
FIG._10.

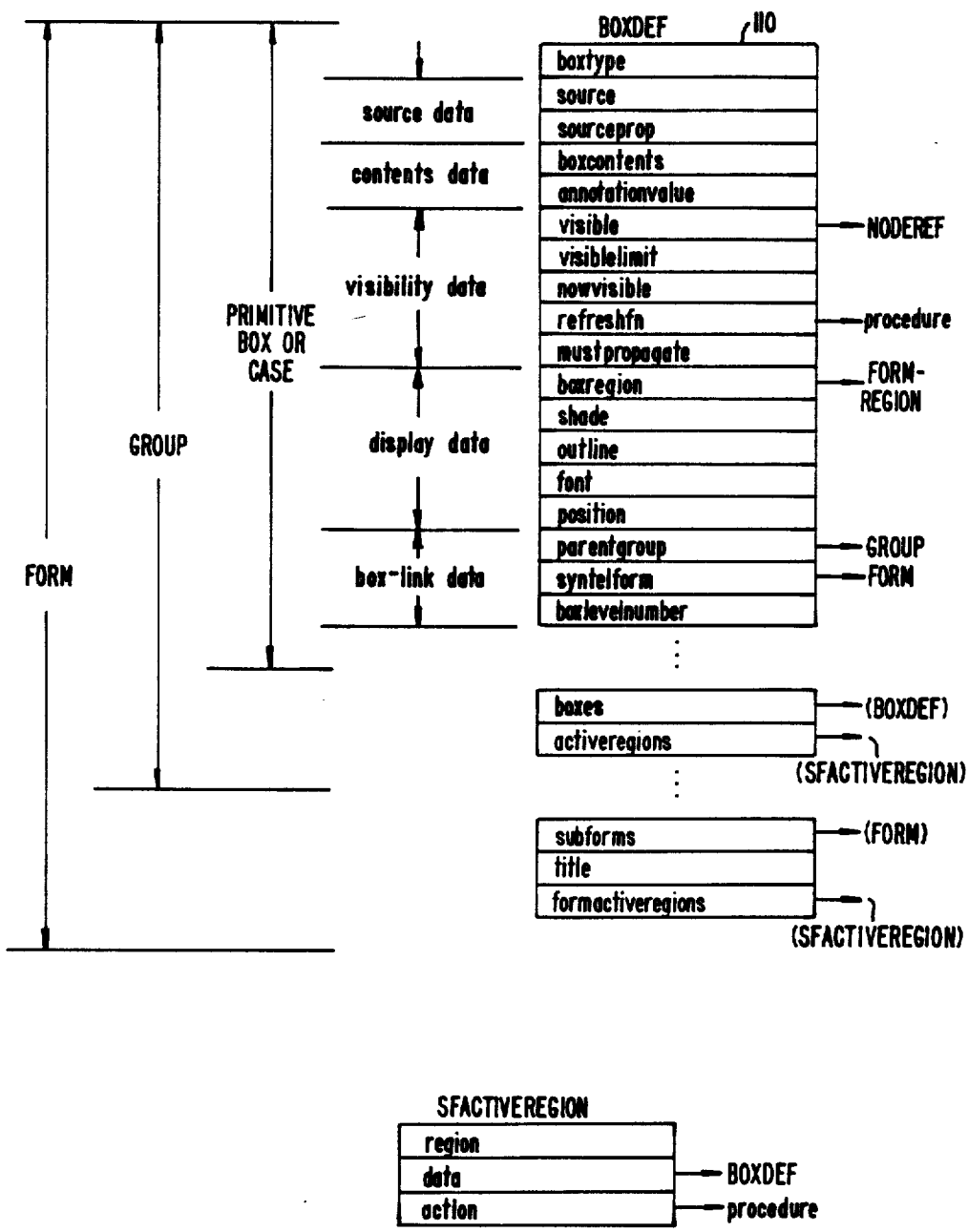
FIG._II.

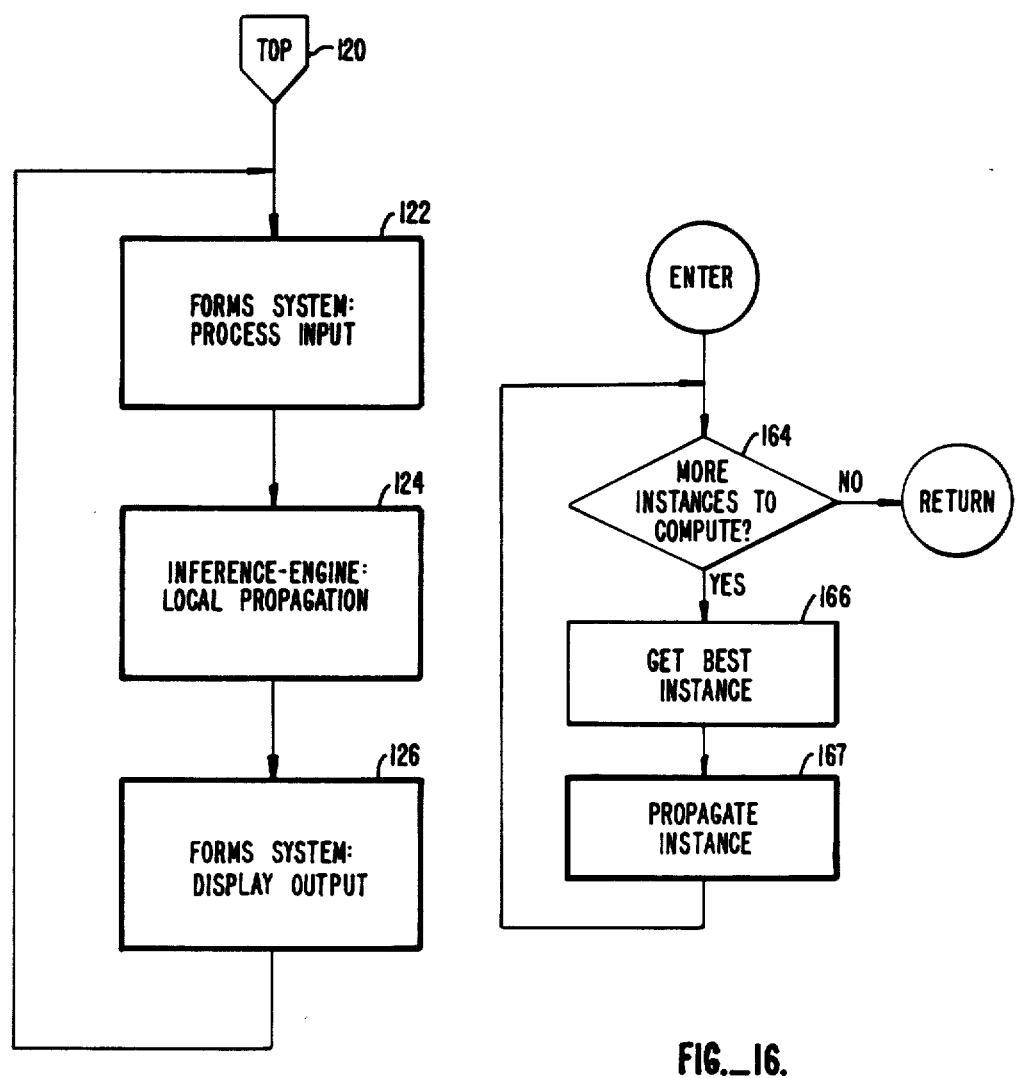

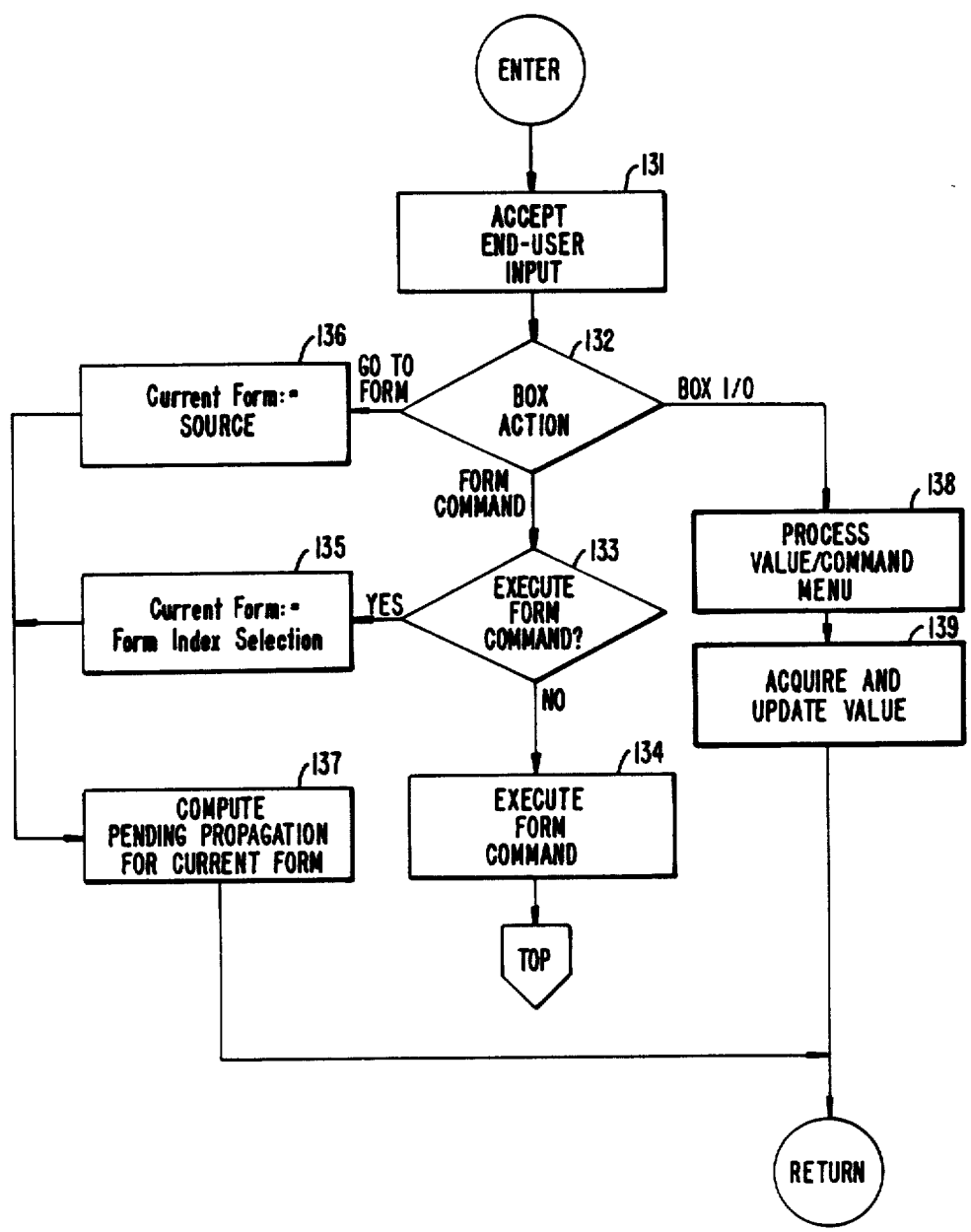
FIG._13.

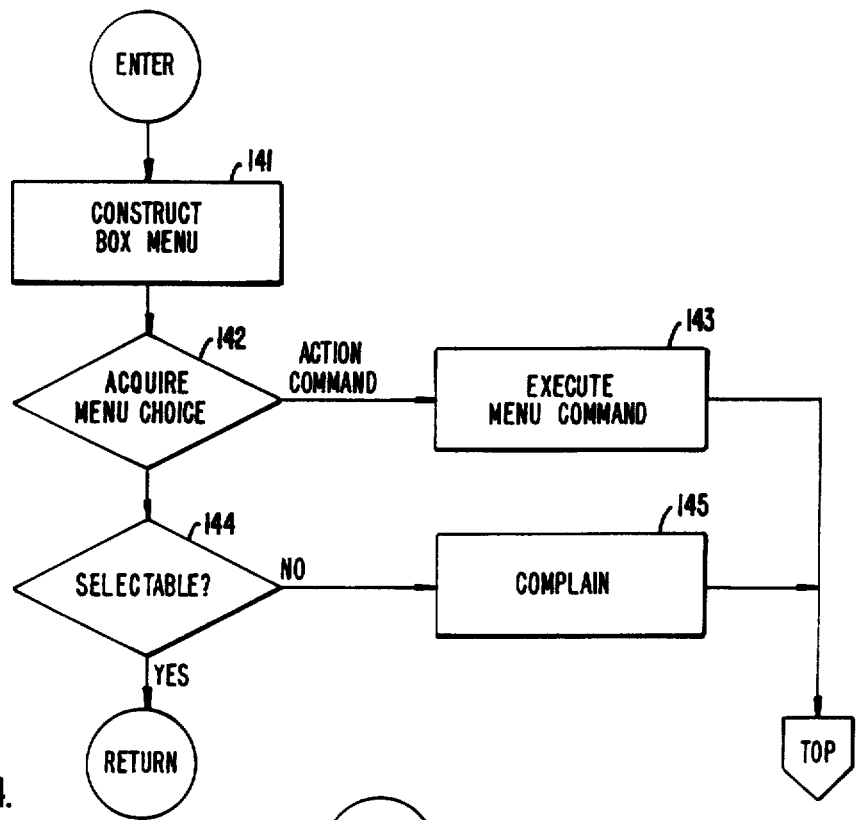
FIG._14.
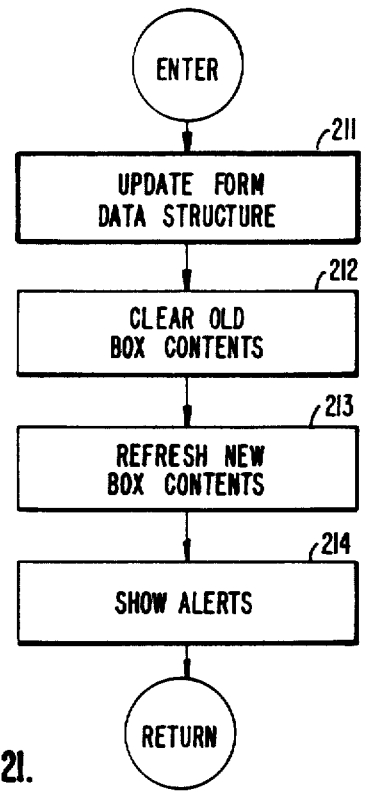
FIG._21.

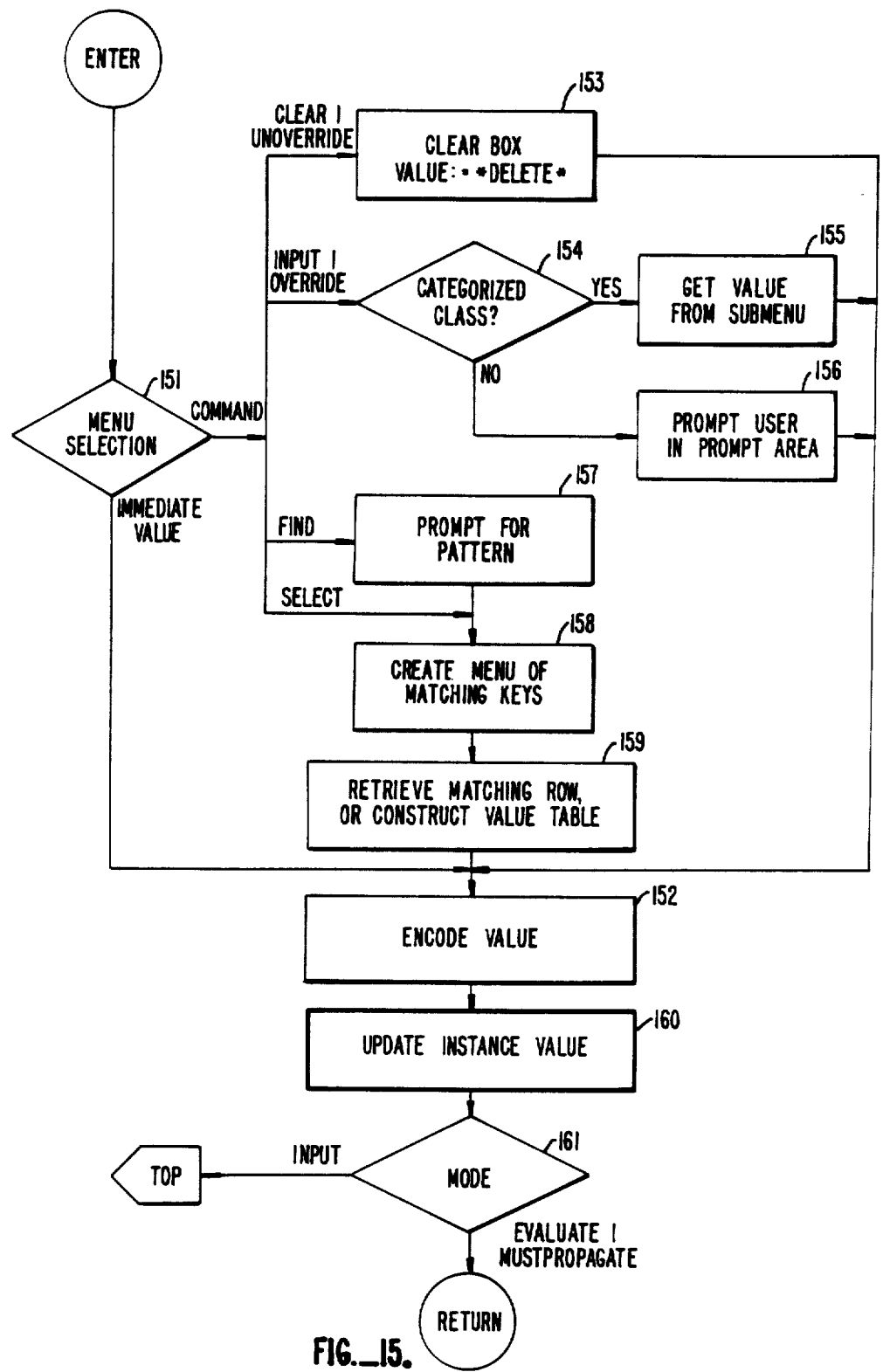
FIG._15.

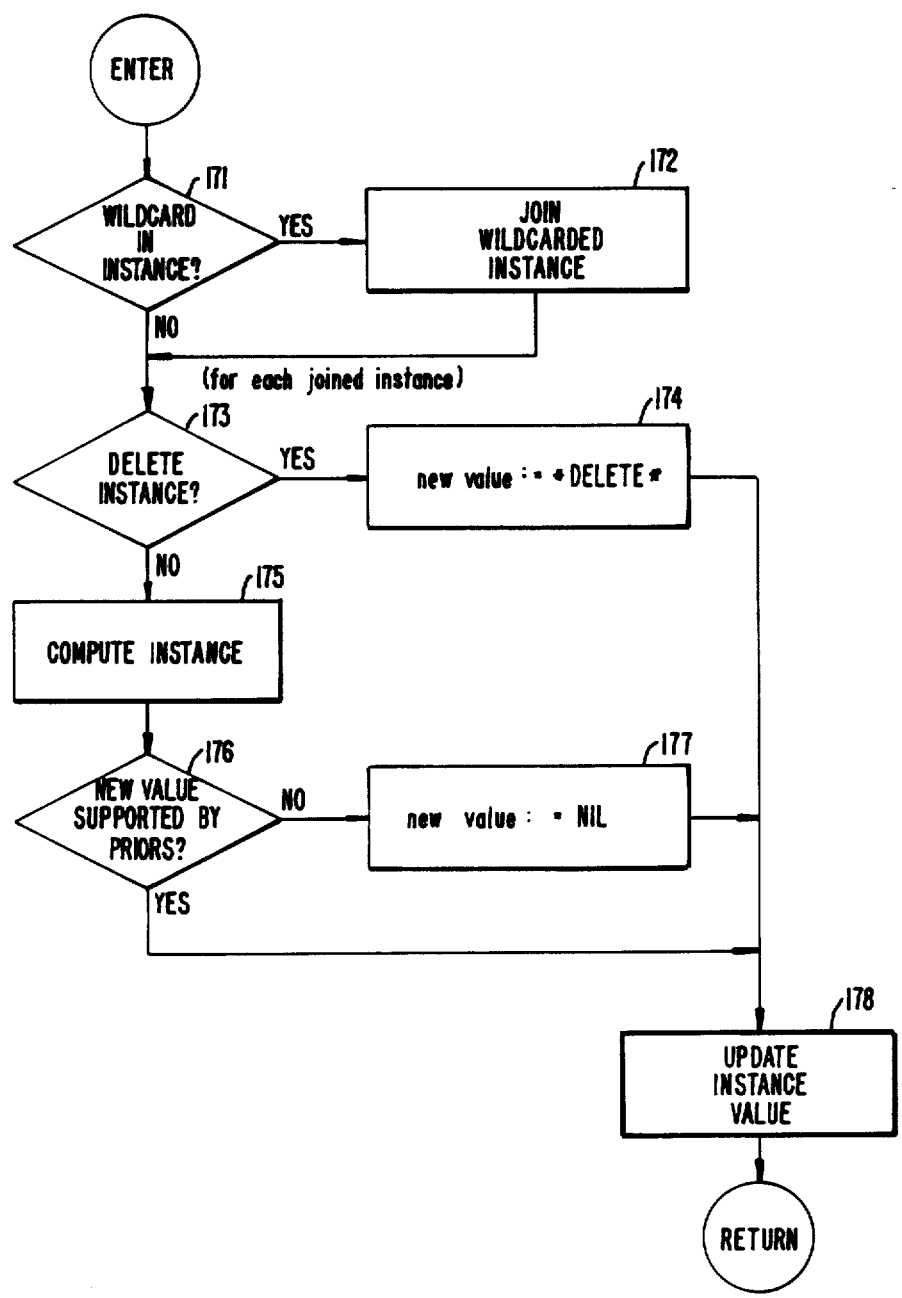
FIG._17.

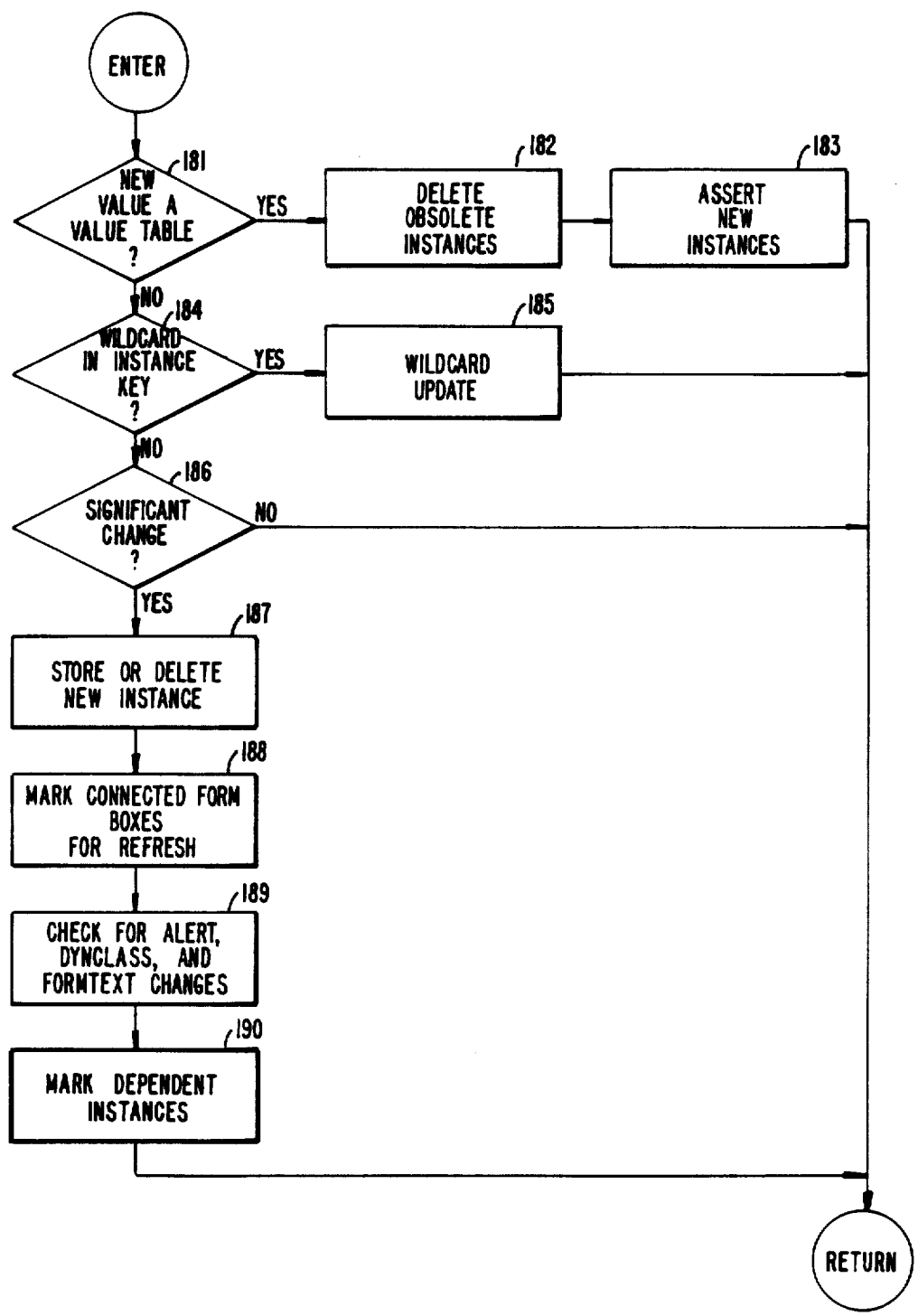
FIG._18.

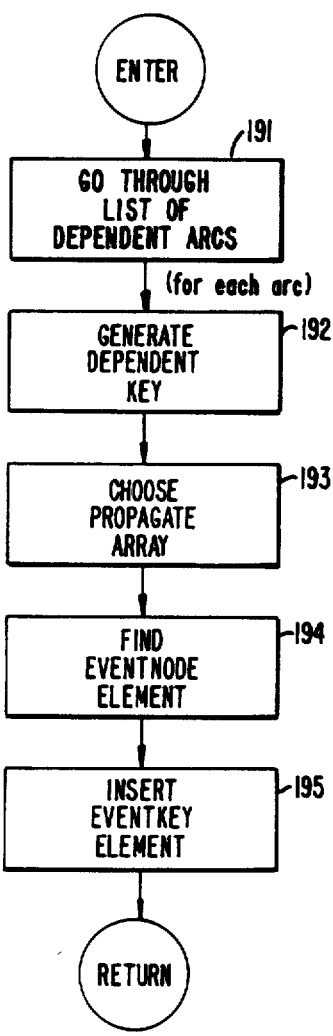
FIG._19.
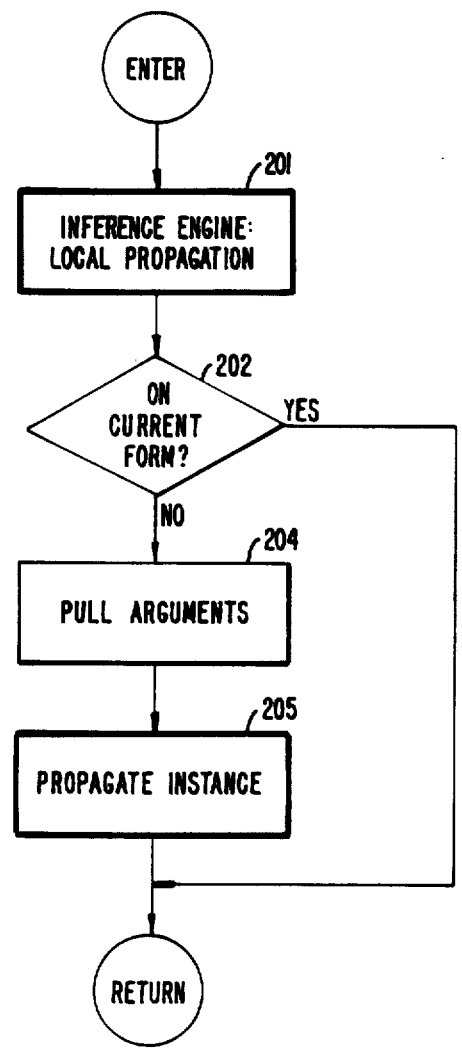
FIG._20.

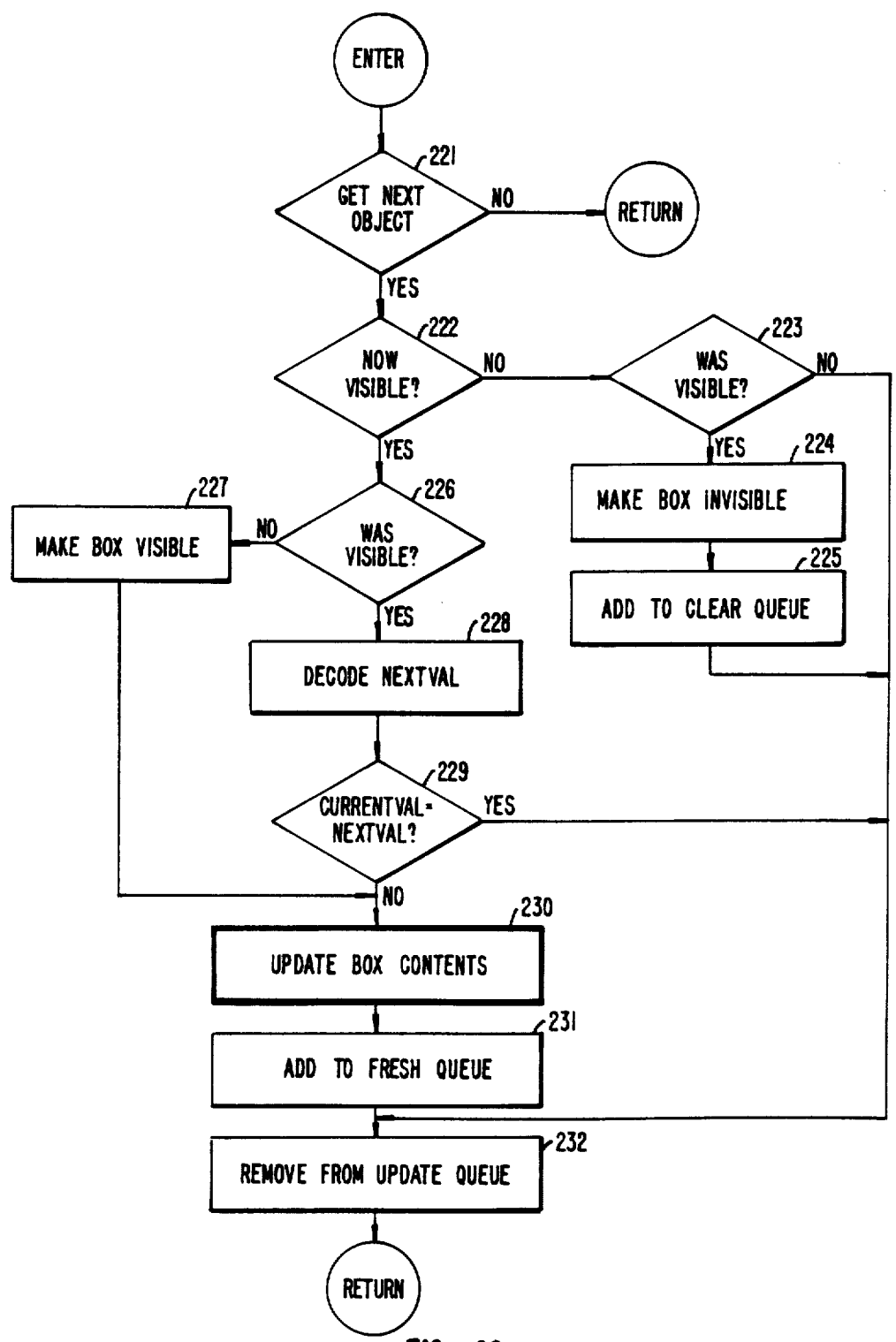
FIG._22.

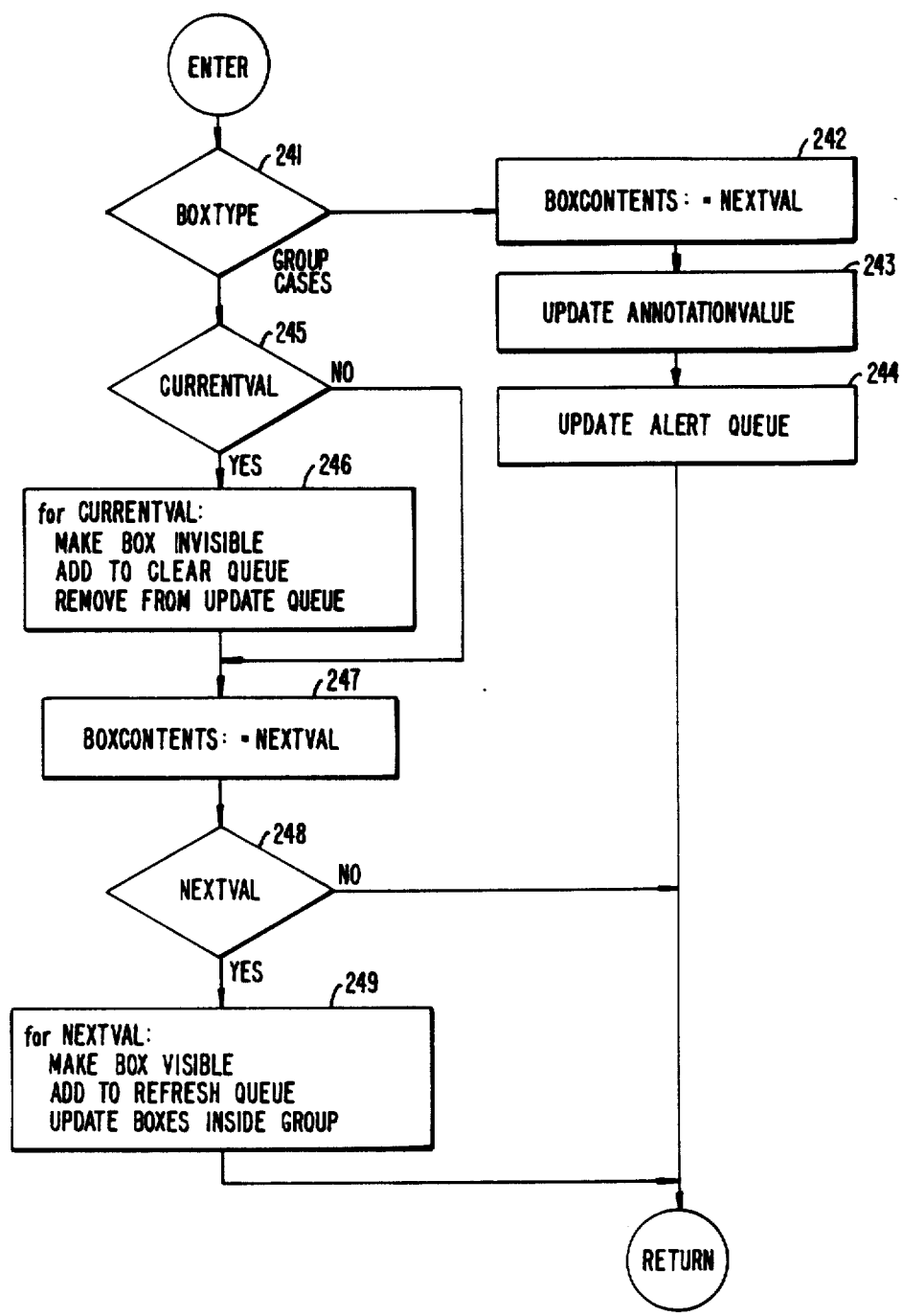
FIG._23.

DATA-DRIVEN, FUNCTIONAL EXPERT SYSTEM SHELL

FIELD OF THE INVENTION

The present invention relates generally to interactive computation of both numeric and symbolic functions, and more particularly to expert systems that use functional knowledge bases.

BACKGROUND OF THE INVENTION

Expert systems are computer programs that emulate reasoning tasks by applying the encoded knowledge of specialists or experts to facts about a problem provided by the end user. Typical expert systems use specialized formal structures such as "rules" or "frames" to encode the knowledge in a data structure called the knowledge base.

An expert system with an empty knowledge base is called an expert system shell. The part of the shell that applies the encoded knowledge to specific facts is called the inference engine. Because useful results can often be obtained by applying only some of the encoded knowledge, expert systems can often cope with missing or incomplete information. In addition, because the knowledge being used is explicitly encoded, expert systems can often provide useful explanations for their conclusions by presenting the knowledge used.

A serious limitation of existing expert systems arises from the means used to apply the formalized knowledge to facts about a particular case. The two standard approaches are goal-driven strategies and data-driven strategies. In a goal-driven system, an initial goal is defined, and the inference engine asks the end user a series of questions as it attempts to gather information that links the formalized knowledge to the goal. In a data-driven system, the end user states all the known facts at the outset, and the system matches these facts with the formalized knowledge to draw any and all derivable conclusions.

Goal-driven systems are widely used in expert systems for consultation. They have the advantage of simple and focused end-user interaction, since the system is in complete control over what is asked when. However, questioning sequences can be unacceptably lengthy, particularly for professional end users. Data-driven systems have the advantage of providing the end user much greater freedom. However, they are prone to be inefficient, wasting time deriving the consequences of irrelevant facts. In addition, if the end user omits important items, such systems often provide little or nothing in the way of prompting. While existing expert systems often support both of these strategies, they require the use of only one of them at a given time, accepting the consequent disadvantages as a necessary compromise.

Another limitation stems from the fact that knowledge bases are often incomplete. While explanations provided by the system allow the end user to understand why the system and the end user disagree about some conclusion, there is often no way for the end user to "change the system's mind" other than to modify the input facts in an attempt to get the desired results—a clearly undesirable practice.

Further, because it is frequently inconvenient or even impossible to encode all of the knowledge in a knowledge base in a declarative or nonprocedural form, most expert systems must provide "procedural escapes" that allow the knowledge engineer to augment the knowledge base with procedural programs written in a different host language. This is particularly common when numerical calculations are required that are inconvenient or impossible to express in the form of rules. Unless great care is taken, such procedures often introduce "side effects." Side effects make the conclusions sensitive to the sequence in which the facts were entered, and make it particularly hard to cope with missing information, to provide explanations, to allow the end user to change answers, or to save the facts for a case and be sure of obtaining the same results when these facts are reloaded.

SUMMARY OF THE INVENTION

The invention is particularly appropriate for creating expert systems for assessment problems, such as financial risk assessment problems or bidding estimation problems or property appraisal problems. Among other things, these problems are characterized by (a) the need to reflect the uncertainty introduced by the lack of complete information, (b) the naturalness of representing knowledge in terms of the functional rather than rule-based relationships between facts and assessments, and (c) the need to analyze cases involving sets of similar objects, such as tables of financial data or schedules of buildings and properties. Thus, the invention represents symbolic as well as numeric knowledge in terms of the functional relationships between variables that are tables of possibly uncertain values.

To provide a particularly effective means for solving such problems, the invention brings together and extends a novel and powerful combination of methods and concepts drawn from three areas of software technology: (1) expert systems, (2) spreadsheet systems, and (3) relational database systems. Expert systems technology provides concepts for drawing plausible inferences from formalized symbolic knowledge. Spreadsheet technology provides concepts for the data-driven propagation of numerical information through a network of functions. Relational database technology provides concepts for storing and retrieving symbolic or numeric information in tabular form, independent of the underlying physical storage mechanisms.

A basic object of the invention is to provide an expert system shell that has the focus and efficiency of goal-driven control while providing the freedom and responsiveness of data-driven control. Users should be able to see everything and only those things that the system wants to know about, but should feel free to answer questions as they wish in the sequence they wish without incurring performance penalties. Interaction with the system should be unconstrained, convenient and efficient.

Another object of the invention is to allow knowledge to be represented in the form of functional relations between variables. This functional representation should provide full support for both numeric and symbolic computations, so that it is never necessary to encode symbolic data numerically, or to escape to a procedural language. This functional representation should also allow variables to represent sets of data, so that any number of instances of variables can be created (and subsequently deleted) at run time.

Another object of the invention is that it should be completely free from side effects, so that the outputs depend only on the inputs, never on the sequence in which the inputs are entered. In particular, the system should allow any and all inputs to be changed freely while maintaining complete logical consistency.

Another object of the invention is to provide useful outputs despite the uncertainty introduced by missing, incomplete or uncertain information. When there is uncertainty in the conclusions, its extent should be clear to the end user "at a glance."

Another object of the invention is that it should allow the end user to override conclusions drawn by the system. The system should substitute the end user's judgment for its answers for all subsequent purposes.

Briefly, in accordance with the invention, a shell is provided for efficiently running a data-driven expert system that uses a functional representation of numeric and symbolic knowledge. Dynamically generated screens show the end user the inputs the system can accept. The end user is free to visit the screens in any sequence, and to answer questions, change answers, or override conclusions in any sequence. When appropriate, the system allows the end user to enter and modify tables of answers to accommodate situations involving multiple instances of objects. The system provides outputs even when only some of the inputs have been entered, and accounts for and vividly reveals the uncertainty that remains because of the missing inputs.

BRIEF DESCRIPTION OF THE FIGURES

FIG. 1 is a high-level dataflow diagram of the preferred embodiment.

FIG. 2 is an illustration of the organization of the display screen of the preferred embodiment.

FIG. 3 is a diagramatic representation of the logical organization of objects on the display screen.

FIG. 4 is a diagramatic representation of the basic record structures of the preferred embodiment.

FIG. 5 is a diagramatic representation of the data structure for a linear list.

FIG. 6 is a diagramatic representation of records containing variable number of fields.

FIG. 7 is a diagrammatic representation of records containing repeating groups.

FIGS. 8A–8C are diagrammatic representations of the ANCHOR, MODEL, and CLASS data structures.

FIG. 9 is a diagrammatic representation of the NODE and ARC data structures.

FIG. 10 is a diagrammatic representation of the dynamic knowledge base data structures.

FIG. 11 is a diagrammatic representation of the data structures for forms, groups, primitive boxes, and SFACTIVEREGION data structures.

FIG. 12 is a top-level flow chart of the operation of the system.

FIG. 13 is a flow chart of the process input procedure of FIG. 12.

FIG. 14 is a flow chart of the Process value/Command menu procedure of FIG. 13.

FIG. 15 is a flow chart of the Acquire and Update Value procedure of FIG. 13.

FIG. 16 is a flow chart of the Local Propagation Process of FIG. 12.

FIG. 17 is a flow chart of the Propagate instance procedure of FIG. 16.

FIG. 18 is a flow chart of the Update Instance Value procedure of FIGS. 15 and 17.

FIG. 19 is a flow chart of the Mark Dependent Instances procedure of FIG. 18.

FIG. 20 is a flow chart of the Pulled Propagation procedure.

FIG. 21 is a flow chart of the Display Output procedure of FIG. 12.

FIG. 22 is a flow chart of the Update Form Data Structure procedure of FIG. 21.

FIG. 23 is a flow chart of the Update Box Contents procedure of FIG. 22.

In the flow charts, a boldly outlined box indicates a procedure that is expanded in detail in a subsequent flow chart.

DESCRIPTION OF THE PREFERRED EMBODIMENT

Major Components and Dataflows

FIG. 1 is a high-level dataflow diagram of the preferred embodiment of an expert system shell 10. Shell 10 comprises a Forms System 12, an Inference Engine 14 and a Compiled Knowledge Base 16.

Forms System 12 manages interaction with an end user 18, through a display device 20 and an entry means 22. Forms System 12 accepts facts about a problem or commands issued to the system, and displays the results of those inputs. Forms System 12 communicates with Inference Engine 14, and also extracts information from Compiled Knowledge Base 16. When end user 18 enters facts that change the values of one or more variables in Compiled Knowledge Base 16, Forms System 12 converts those external inputs into the new internal values of the corresponding knowledge-base variables and transfers them to Inference Engine 14. When Inference Engine 14 returns updated values of other variables affected by the entered variable values, Forms System 12 converts these values to their external form and displays them to end user 18. In so doing, Forms System 12 also draws upon Compiled Knowledge Base 16 for information about how that information should be displayed on display device 20.

In this embodiment, forms System 12 and Inference Engine 20 are implemented in INTERLISP-D executing on an XEROX 1186 workstation. Display device 20 is a cathode-ray-tube. Entry means 22 comprises a "mouse" and a keyboard.

Inference Engine 14 maintains the functional relationships between variables according to the coded specifications in Compiled Knowledge Base 16. When Inference Engine 14 receives changed variable values from Forms System 12, it determines which dependent variables in Compiled Knowledge Base 16 need to be changed, and updates their values as necessary. Inference Engine 14 employs two strategies that optimize efficiency. First, given a set of changed values, Inference Engine 14 uses what is called "balanced, bottom-up propagation" to ensure that no dependent variable is updated more than once. Second, given an identification of the screen that the end user is currently viewing, Inference Engine 14 uses what is called "form-limited propagation" to limit its updating to those variables that are currently visible to the end user.

Compiled Knowledge Base 16 contains (1) the variables, (2) a specification of the functional dependencies among the variables, and (3) a specification of the screen displays for the variables. All of this information is encoded in an internal form in a data structure specifically designed for the Forms System and the Inference Engine. A compiler may be used to create Compiled Knowledge Base 16 from an external specification of this information written in a high-level computer language. The content of Compiled Knowledge Base 16 is dependent upon the particular expert system application and is not, strictly speaking, part of the "shell".

System Concepts and Terminology

To enable a thorough understanding of the operation of the Forms System and the Inference Engine, and how information is structured and stored in the complied knowledge base, key ideas and terminology will first be defined.

(a) Equation Network

The core of the knowledge base is the representation of knowledge as a directed equation network that specifies the functional relations among variables. The basic elements of any directed network are nodes and arcs. Every node has a name and corresponds to a variable. A node with no incoming arcs corresponds to an independent variable; its value is either constant or entered by the end user. A node with incoming arcs corresponds to a dependent variable; its value is computed by a function that combines the values of the variables associated with the incoming arcs. In this embodiment, the function must be one of a fixed set of system-provided primitive functions called comptypes. The information associated with a node includes (among other things) its name, its value, its incoming arcs, and its comptype.

A variable can be either simple or parameterized. A simple variable has a single value. A parameterized variable has multiple values that are stored in a value table. The rows of the value table are called the instances of the variable. Each row is keyed by the parameter(s) associated with the parameterized variable. Table I illustrates an example of the variable FIXEDCOSTS parameterized by the formal parameter YEAR where there are instances for the years 1981, 1982 and 1983:

TABLE I

| YEAR | FIXEDCOSTS |
|------|------------|
| 1981 | 2200 |
| 1982 | 2750 |
| 1983 | 3100 |

The relation between dependent and independent variables can be expressed as an equation corresponding to a portion of the equation network. Equations have the form:

RESULT←F(ARG1, ... ,ARGN)

which defines the variable RESULT as computed by applying comptype F to its arguments. For example, the comptype PLUS yields the sum of its argument values. Then the equation

TOTALCOSTS[YEAR]←PLUS(FIXEDCOSTS[YEAR],VARIABLECOSTS[YEAR]].

expresses the relation between TOTALCOSTS, FIXEDCOSTS, and VARIABLECOSTS for any value of the formal parameter YEAR. At runtime, formal parameters receive values called parameter instances. The parameter instances of the dependent variable are the union of parameter instances of its arguments. For example, if the value tables for FIXEDCOSTS and VARIABLECOSTS are

| YEAR | FIXEDCOSTS | YEAR | VARIABLECOSTS |
|------|------------|------|---------------|
| 1981 | 2200 | 1980 | 1100 |
| 1982 | 2750 | 1981 | 2250 |
| 1983 | 3100 | | | then the value table for TOTALCOSTS is as follows:

| YEAR | TOTALCOSTS |
|------|------------|
| 1980 | NIL |
| 1981 | 4450 |
| 1982 | NIL |
| 1983 | NIL | where the value NIL corresponds to "undefined."

A node name, together with actual parameter(s), are together called a node reference (or node-ref), and correspond to a specific instance of a variable. NIL is also the default parameter value, used when no explicit instance is available. The special symbol && is used to indicate that all instances of a parameter are to be used.

All variable values are typed. The type of a variable is called its class. A number of primitive classes, such as STRING, are provided in this embodiment, and any number of additional classes can be defined in the Compiled Knowledge Base. Classes are arranged in a IS-A hierarchy, such as POSINTEGER IS-A INTEGER. Properties of superior classes are inherited by inferior classes. Different classes of variables can take on values such as logical values, strings, discrete values, or continuous values. Variables that assume only discrete values are collectively termed categorized variables. A pair of encode/decode functions associated with each class translates between the external representation of each variable as a string and its internal representation.

Values can be undefined, exact, or uncertain. An undefined value is represented by NIL. Uncertain values are represented by probability distributions. Discrete-valued inexact variables are represented by discrete distributions; continuous-valued inexact variables are represented by normal distributions. The Compiled Knowledge Base can separately record any probability distribution as being a prior distribution, i.e., a distribution to be used in the event that no other distribution is available through either computation or direct input.

Collections of nodes can be grouped into models to provide separate name-spaces for nodes.

(b) Comptypes

In the preferred implementation of the invention, there are 52 different comptypes that define the allowed set of primitive functions. Of these, 14 comptypes implement arithmetic functions such as PLUS; 10 comptypes implement logical operations such as GT (greater than); six comptypes, such as MAX, select extreme values of simple or parameterized variables; 3 comptypes define nodes with no incoming arcs, such as VALUE (for an input node); 3 comptypes implement string manipulation operations, such as CONCAT; 3 comptypes implement tests on input nodes, such as whether the end user has provided a specific input item; one comptype implements data extraction from an external relation; 3 comptypes implement set operations.

In addition to these comptypes, there are 9 comptypes that implement various kinds of node translation or combination. Some of these comptypes change the form in which data is stored, but do not change the underlying contents. The INSTANTIATE comptype, for example, can combine a number of simple nodes into separate instances of a single parameterized node.

Other comptypes combine their arguments to produce new values. The WEIGHT comptype forms a sum of piecewise-linear "voting" functions of its arguments and then saturates the sum with a sigmoid function. A similar comptype, WEIGHTAGG, performs the same operation but extracts the voting functions from a table at runtime.

Each comptype has an associated implementation that computes its output value given the values of its arguments. When the values of the arguments are known exactly, then this computation corresponds to ordinary function evaluation. When the values of the arguments are uncertain—i.e., represented by a probability distribution with strictly positive variance—then the output variable of the comptype will in general also be uncertain. In this case, function evaluation must be replaced by a more complex process that computes the probability distribution of the output variable given the probability distributions of its inputs. This process is called propagation of probability distributions.

Methods for propagating probability distributions are well-studied in the field of mathematical probability theory under the heading of functions of random variables. See, for example, Parzen, Modern Probability Theory and its Applications (Wiley, N.Y. 1960). In this embodiment, the application of these methods is facilitated by two considerations: First, the arguments to each comptype are assumed to be statistically independent of each other. Second, only means and variances need be computed for continuous variables, since normal distributions are completely defined by their means and variances.

The PLUS comptype provides an example of propagation. From the theory of functions of random variables, it is known that the mean of a sum is equal to the sum of the means, and that the variance of a sum is equal to the sum of the variances. Propagation through PLUS is thus accomplished by two additions. Propagation through other comptypes is similarly implemented by applying the theory of functions of random variables.

(c) Forms System

The Forms System mediates all interaction with the end user. The Forms System is supported by conventional hardware consisting of a display terminal, a keyboard, and a pointing device called a mouse. The mouse is used to position a cursor over an active region of the screen and clicking a button to select an action or a value.

The end user has the choice of a number of different screen displays. The complete definition of each screen is contained in the Compiled Knowledge Base. Each screen has the general appearance of a business form. The forms are arranged in a hierarchy, and are accessed by means of a form index. The mouse is used to select the desired form. FIG. 2 illustrates some of the objects that can appear on a typical form 30 including a command bar 32, a number of input and output boxes 34, a menu 36, and an alert 38. These objects are described below.

Once a form has been accessed, the end user enters data by first selecting a box on the form. (A single geometric box on the display is represented in the internal data structure by an object termed a primitive box. For brevity, the physically displayed object is referred to simply as a box.) Depending on the Compiled Knowledge Base, data is then entered either by directly typing in a screen region called the prompt area, or by selecting from a pop-up menu that appears when the box is selected. The contents of the menu depend dynamically on the box that has been selected and, depending on the Compiled Knowledge Base, may offer the end user the ability to search for desired items in relational tables.

In addition to direct data input, a number of commands are available to the end user. Commands at the level of the business form initiate actions such as loading or saving data, or returning to the screen index. Commands at the level of an individual box enable actions such as creating a footnote, overriding a computed output value with a different value provided by the end user, or unoverriding a previously overridden value (i.e., restoring a computed output value.)

Every box on a form can be associated with some node in the equation network termed the source of the box. If the box is used to input data, and if the source is a simple variable, then the data so obtained is asserted as the value of the variable. If the source is a parameterized variable, then a node-ref is constructed by combining the given input box with a second box (or boxes) that is called a selector for the given input box. The selector box (or boxes) specifies the instance of the source that is to receive the input value.

If the box is an output box, then the box displays the value of the source node. The output can be displayed in several ways. Numbers and strings are displayed using conventional external representations, with some number of trailing question marks appended if there is sufficient uncertainty represented by the variance of the underlying probability distribution. In addition, variable values can be displayed as meters. The dark region of the meter represents the range of the variable needed to account for a pre-defined probability mass, such as 75%. Thus, sharply-defined, narrow distributions will be displayed by meters having a narrow dark region, while broad distributions will have a broad dark region. An intermediate shade of gray is used to augment the dark region in such a way as to account for an additional probability mass, such as 95%.

A special output means is provided called an alert 38. An alert is a conditional test that is associated with any given node, and that contains a string to be displayed. Whenever the conditional test is satisfied, the string is immediately displayed to the end user, alerting the end user to the existence of the condition being tested.

FIG. 3 illustrates the components of a form. These components are called display objects. A primitive box is a basic display object. Display objects can be grouped together to form other display objects. In particular, a form is also a display object. Display objects can be conditionally visible, appearing or disappearing depending upon the state of variables in the Compiled Knowledge Base. The display objects in a case object are even allowed to overlap, provided that only one of the alternative group objects it contains is visible at any given time.

Compiled-Knowledge-Base Data Structures

The principal data structures used by the Compiled Knowledge Base will now be described. The data structures are exhibited in a series of figures that follow certain conventions, which are described first.

(a) Conventions

Referring to FIG. 4, two hypothetical record structures PERSON 42 and ADDRESS 44 are shown. PERSON has four fields (attributes) called LAST-NAME, PERSON-ADDRESS, PERSON-EMPLOYER and DEPENDENTS. The arrow emanating from PERSON-ADDRESS indicates that PERSON-ADDRESS contains a pointer to another object, in this case the record structure labelled ADDRESS. (The precise alignment of the head of an arrow is not significant; it means that the entire record is being pointed to, not a field within a record.) The fields PERSON-EMPLOYER and DEPENDENTS in PERSON 42 also have arrows emanating from them, and so by convention also point to objects. Field PERSON-EMPLOYER points to an object of type COMPANY (not shown), while the braces indicate that DEPENDENTS points to a list of objects, which in this example are of type PERSON. The first field of PERSON contains the value of the LAST-NAME attribute, e.g., "Smith". The types of values (e.g., a string value or alogical value) permitted for various fields would be found in the data dictionary for the data structures.

Referring to FIG. 5, the logical equivalent of a list is represented by the record structure OBJLIST 50. The first two fields contain OBNAME and OBPROP, while the third field contains a pointer to another instance of type OBJLIST. Following the sequence of NEXT pointers is equivalent to "CDRing" down a list.

FIG. 6 illustrates the convention used to group fields together for readability, and the convention used to indicate record structures of variable size. The fields containing aaa and bbb provide a LITTLE-INFO1 amount of information about VARSIZEOB. By including the additional fields ccc and ddd (collectively referred to as LITTLE-INFO2), MORE-INFO is provided. Finally, certain objects require additional data. In the illustration, because the fifth field indicates that VARSIZEOB is a FANCY-OB, the record structure has two additional fields containing eee and fff. The dotted line indicates that these two fields occur only under certain conditions.

A record structure can contain repeating groups, forming the logical equivalent of an array. FIG. 7 illustrates the convention used to indicate a repeating group. The record structure called HASHTABLE has a single field containing SIZE and a number of BUCKETs. This data structure can be thought of either as an array of size equal to SIZE or as a record structure with a (SIZE+1) number of fields.

(b) Data Structure Description

The data structures used in the preferred embodiment of the invention are illustrated in FIGS. 8 through 11. The data dictionary (given in Appendix 2, hereto) gives detailed descriptions of all of the fields in these records. This section provides an overview of the major characteristics of these data structures.

Referring to FIG. 8A, the entry point is a unique record called an Anchor 82. All objects in the knowledge base can be reached from the pointers in the eleven fields in the Anchor. These fields contain pointers to (a) a list of all the models in the Compiled Knowledge Base, (b) a list of all the classes in the Compiled Knowledge Base, (c) the two dynamic data structures for the Inference Engine (the local propagation array and the global propagation array), and (d) the global dynamic data structures used by the Forms System (three fields for form information and four queues for screen updating).

FIG. 8B also shows the record structure for a class 86. The classes are organized into a class hierarchy. Every class record contains a unique class name. Other class properties can either be specified directly in the class record structure, or can be inherited through the class hierarchy. The is-a field either points to the parent class for a class or is NIL, indicating that the class is one of the root classes. Thus, the class data structure makes it easy to find the parents of any class, which is what is needed for inheritance; given a class, the system can retrieve its properties (scaletype, categories and encode/decode functions) either by direct lookup or through climbing the inheritance tree.

All of the nodes and arcs in the equation network can be reached from the anchor by going through the models, which are collections of nodes. Referring to FIG. 8C, the record for each model 88 contains the name of the model, a count of the number of entries in the node hash table for the model, and the node hash table itself. The node hash table provides a fast way to retrieve the node record structure from the node name, although with the usual problem that different node names may "clash" and hash to the same node bucket. Resolution of clashes is handled by the node data structure.

FIG. 9 shows the record structures for nodes 92 and arcs 94. The nextnode field in a node record links the nodes into lists, each list corresponding to the node names that hash to the same node bucket. These lists typically contain only one element. However, when clashes occur, the system must search the node list to find the desired node, which is identified by the name field. Once the node is located, the node data structure provides quick access to the 20 other node properties shown in FIG. 9. All 22 fields are described in the Data Dictionary in Appendix 2.

It should be noted, however, that the parameters associated with nodes and arcs are represented by the special PARAMCOMBTABLE record structure. This data structure represents combinations of parameter references of the Compiled Knowledge Base. Parameter combination may occur in several places of the Compiled Knowledge Base data structures, e.g., DEPENDSON of nodes and ACTPARAMS of ARCs. The parameter combinations are unique, so that if more than one node or form source refer to the same parameter combination the reference will point to the same PARAMCOMBTBL object. This makes the knowledge bases representation more compact and allows the Inference Engine to test quickly if two parameter combinations are the same by simply comparing the addresses of their PARAMCOMBTBL objects.

FIG. 10 shows the Dynamic Compiled Knowledge Base data structures, which represent the data values asserted by the system at run time. While the other data structures are static and never change when the application is run, the Dynamic Compiled Knowledge Base data structures change during execution.

There are three kinds of Dynamic Compiled Knowledge Base data structures:

1. Value tables holding the instances of each node are implemented by the data structure VALUETABLE 102.

2. Keys holding the parameter values created during the execution are represented by the data structure PARAMCOMB 104. The keys are unique, so that if two value table instances or other data structures have the same key it will point to the same PARAMCOMB object. This saves a lot of space, since in practice the same key may be used in many places.

3. Node instances marked for (re)computation, or propagate arrays, are represented by the local and the global propagate array. When an instance is a member of a propagate array, that indicates that it needs to be (re)propagated. The instances appearing in the propagate arrays are grouped in two levels:

a. On the highest level, marked instances belonging to nodes with the same LEVEL attribute are grouped together using indexing into an array, NODEBUCKETS, of the data structure EVENTARRAY 106.

b. For each index of NODEBUCKETS the marked instances are grouped per node using the data structure EVENTNODE 108. Each EVENTNODE object has an associated AVL tree holding the marked instances of the node.

FIG. 11 shows the BOXDEF record structure 110 which is used to represent Screen Objects. There are four kinds of Screen Objects: Primitive Boxes, Group Objects, Case Objects, and Forms.

A Primitive Box corresponds to a single geometric box shown on the form. Primitive Boxes can be grouped to form a Group Object, and several Group Objects can be grouped to form a Case Object. As FIG. 3 illustrates, Group Objects, Case Objects, and Primitive Boxes can be intermixed freely to construct a Group Object. The four kinds of Screen Objects are distinguished in the BOXDEF data structure 110 by the BOXTYPE attribute. This attribute is NIL or missing for a Primitive Box, and is one of the keywords GROUP, CASES, or FORM for a Group Object, a Case Object, or a Form, respectively.

Group Objects, Case Objects and Primitive Boxes are linked to the form they appear in through the SYNTELFORM attribute and organized in a Box Hierarchy through the BOXES and PARENTGROUP attributes. BOXES, which is present only in Group Objects, specifies the list of Screen Objects contained in the Group Object. PARENTGROUP specifies the Group Object containing the Screen Object.

Forms are organized in a Form Hierarchy through their SUBFORMS attribute. The top-most form of the hierarchy is the Cover-Form stored in the ANCHOR data structure (FIG. 8). The Form Hierarchy is employed to construct form-index menus, enabling the end user to move from one form to another. Because more than one parent form is allowed for any form in the Form Hierarchy, the system maintains, in the Form-Path attribute of the Anchor, the most recent path the user traversed to arrive at the Current Form.

Data associated with a Screen Object is computed from its SOURCE attribute and stored in its BOXCONTENTS attribute. A Primitive Box is linked to the Compiled Knowledge Base when its SOURCE attribute is a node-ref. A visibility condition (a node-ref) can be associated through the VISIBLE attribute with any Screen Object and determines whether or not the Screen Object is displayed. For a Case Object, each Group Object it contains will have its own visibility condition, so that only one of the alternative layouts is displayed in the form area reserved for the Case Object.

Also shown in FIG. 11 is the record structure for SFACTIVEREGION. Its purpose is to associate a form region with a Primitive Box. The form region stored in the REGION attribute is made mouse-sensitive, so that when a mouse click is detected in that region the procedure stored in the ACTION attribute is applied to the screen-object data structure stored in the DATA attribute.

Description of Procedures

A detailed description of the basic procedures used in the preferred embodiment of the Forms System and the Inference Engine will now be provided. Many of these procedures are recursive or reentrant. In particular, the procedural steps executed by the Forms System frequently call procedures of the Inference Engine.

FIG. 12 shows the basic flow of control. The program begins at (and frequently returns to) TOP 120. At block 122, the Forms System begins by waiting for input from the end user. It responds directly to certain inputs (such as certain commands), after which the program returns to TOP and again awaits more end-user input. In response to other inputs, the Forms System constructs a set of requests and set of changed variable values for the Inference Engine. At block 124, the Inference Engine uses these results to update the values of variables in the Compiled Knowledge Base, and constructs a set of appropriate updated values for the Forms System. At block 126, the Forms System then displays the updated values and returns to TOP 120 to await more end-user input. Each of these major steps will now be described in detail.

Referring to FIG. 13, the process-input step is shown in detail. At step 131, the user input is accepted. The FORMACTIVEREGIONS field of a form's data structure contains a dynamic list of SFACTIVEREGION records (FIG. 11). Each SFACTIVEREGION associates a mouse-sensitive region with a BOXDEF record (a Primitive Box) and a procedure. Whenever the end user clicks the mouse inside a sensitive region, the corresponding box is identified and the associated procedure is applied to the box.

At step 132, the action associated with a particular box is determined. This will depend upon compile-time analysis of the box's data structure. If the box displays the name of a form command, then Step 133 determines if the command is a form index command.

If the form command is not a form index command, then at step 134, the form command is executed. A form command is one of the following:

HELP—to inquire the system on the use of form commands;

SAVE—to save a business case;

LOAD—to load a business case previously saved with SAVE;

CLEAR—to clear all the forms and the Compiled Knowledge Base of all data entered for a business case;

INPUT—to enter INPUT mode (buffered evaluation);

EVALUATE—to resume normal evaluation mode;

REPORT—to generate report for a business case.

The procedure for performing each command is associated with the box. It is executed, and control is returned to TOP.

If the form command is a form index command, then at step 135, the form index command is executed. A form index command is one of the following:

SCREEN-INDEX—A menu is constructed that contains the form titles of all forms that are currently visible. The set of forms included in the menu is collected starting from the Cover Form, (the COVERFORM attribute of the Anchor data structure) and following down the Form Hierarchy through the SUBFORMS attribute of each form. The list of forms specified in the SUBFORMS attribute is traversed from left to right. Each form is considered for collection only once, and only if it is visible. The end user selects a form title from the menu and the corresponding form becomes the Current Form. The Anchor data structure is updated to reflect the new Current Form.

FORM-INDEX—Same as SCREEN-INDEX, except that the form collection process starts with the parent form of the Current Form. The parent form is the last form inserted in the Form-Path (which maintains the path in the Form Hierarchy followed by the user from the Cover Form to arrive at the Current Form).

TABLE-OF-CONTENTS—Determine the parent form of the Current Form as in FORM-INDEX. Make that parent form be the new Current Form by updating the Anchor.

NEXT-SCREEN—Determine the parent form of the Current Form as in FORM-INDEX. Given the ordered list of forms stored in the SUBFORMS attribute of this parent form, locate the first visible form in the list to the right of the Current Form. Make that form (or the parent form, if Current Form was the last visible form in the SUBFORMS list) be the new Current Form by updating the Anchor.

PREVIOUS-SCREEN—Similar to NEXT-SCREEN, except that the first visible form in the SUBFORMS list to the left of the Current Form is located instead.

For all five screen index commands, the visibility condition of a form is determined from its VISIBLE attribute. This attribute specifies the node-ref corresponding to the form's visibility condition. The value of the condition node-ref is "pulled" from the KB. (Pulled propagation is described below with reference to FIG. 20.) If the node-ref's CLASS is LOGICAL, the form's VISIBLELIMIT attribute is used as the probability threshold against which the node-ref's probability is compared.

If the test at Step 132 indicates that the box displays the form's title (the contents of the form's TITLE attribute), then at Step 136 the corresponding form is determined from its SOURCE attribute. That form is made the new Current Form by updating the Anchor.

At Step 137, pending propagation is computed. The form-limited propagation mechanism defers the propagation of modified nodes when the effect of such propagation cannot be shown on the Current Form. The deferred propagations are maintained as events on GLOBAL-PROPAGATEARRAY (on the Anchor data structure). A similar EVENTARRAY data structure, LOCAL-PROPAGATEARRAY, drives the propagation of values that are needed to update the Current Form. Whenever the Current Form changes, we must move to LOCAL-PROPAGATEARRAY those events on the GLOBAL-PROPAGATEARRAY that will affect the new Current Form. These events are obtained by sweeping through GLOBAL-PROPAGATEARRAY and collecting each event where Current Form appears in the PROPSTO attribute of the node-ref associated with the event. A node's PROPSTO attribute is a list of forms requiring its propagation because the effect is shown on (or is relevant to) all those forms. It is computed and stored with the node during compile-time analysis.

If the test at Step 132 determines that the box is linked to a node-ref in the Compiled Knowledge Base as indicated in the SOURCE attribute of the box, then an interaction with the end user occurs about this specific primitive box. The exact interaction will depend upon compile-time analysis data stored in the box's data structure as well as run-time status of the Compiled Knowledge Base. The two Steps 138 and 139 allow the end user to enter or modify values for Input boxes, override values of Output boxes, as well as perform a variety of box commands (e.g., attaching a footnote, examining the system's line of reasoning, etc.).

FIG. 14 illustrates the operation of the PROCESS VALUE/COMMAND MENU procedure. (FIG. 13, 138) At Step 141, a menu of choices is constructed consisting of the union of the set of possible values that can be entered for this box and the set of all commands that are relevant to this box.

If the box is an "input" box, and if the CLASS of the associated SOURCE (node) is a categorized class, the set of possible input values consists of the categories of that CLASS. Otherwise, the menu will only contain commands. (To determine whether the box is an "input" or "output" type box is straightforward because it is implied by the procedure being executed. This procedure is determined during compile-time analysis and stored in the SFACTIVEREGION data structure that has this box in its DATA field.)

Starting with the full set of all possible box actions supported, the set of applicable commands is computed by filtering out all commands that do not apply, given what is currently known about the box by examining its data structure.

At Step 142, the menu choice is analyzed. The menu may contain special commands as well as possible values. Furthermore, there are two kinds of commands: those that simply perform some particular action (such as Show Reasoning, FootNotes, etc.) and those that enable the end user to enter input data (i.e., in the case where a set of possible values was not included in the menu because the class was not categorized). If the end user selects an action command, the corresponding procedure (Step 143) is performed and control returns to the TOP. Otherwise, Step 144 determines if the selection is valid before returning and proceeding to Step 139. If the selection is invalid, (which occurs, for instance, when the SOURCE is a parameterized node reference and no fully defined instance exists for that node reference because not all parameter values have been entered) a message is issued (Step 145) before returning to TOP. A valid selection is either an "immediate value" (selected from the menu) or one of the commands: Clear, Unoverride, Input, Override, Find, Select.

FIG. 15 illustrates the operation of the ACQUIRE AND UPDATE VALUE step. (FIG. 13, 139) At Step 151, a test determines if the valid menu selection (forwarded from Step 144) is a command or an immediate value. If it is an immediate value, control proceeds to Step 152. If it is a command, control proceeds to the appropriate branch to treat the command, and thereafter to Step 152.

If the command is "Clear" or "Unoverride" then at Step 153 the box is cleared and the value is set to the special internal value *DELETE*. This special value is recognized by the Inference Engine to perform the necessary updating of the corresponding node value and propagation.

If the command is "Input" or "Override" then at Step 154 obtain a value from the end user by either creating a submenu of possible values (155) if the class of corresponding node is categorized, otherwise, by directly prompting the end user in the system's prompt area (156). Prompting text is computed from the FORMTEXT attribute of the node. The end-user's entry is typed directly in the prompt area.

The commands "Find" and "Select" allow the end user to select one input value from a menu. The menu choices are dynamic and retrieved either from a Relation or from the instances of a parameterized node. If the end user clicks "Select", the complete menu of input choices is presented at Step 158. If the end user clicks "Find", he or she will first have to input a pattern (which can contain wildcard characters) restricting the menu choices (Step 157), after which the restricted menu is presented (Step 158). The node to which the box is connected (through the SOURCE attribute) must have one of the attributes MATCHRELATION or CURSORFOR. These attributes describe how the dynamic menu items are retrieved. MATCHRELATION is used when the items are retrieved from a Relation, and CURSORFOR is used when they are retrieved from a parameterized node (Step 159)

The MATCHRELATION attribute specifies the column in the relation from which the items are retrieved. An optional KEY specifies which rows of the column to retrieve. If KEY is specified, pulled propagation has to be performed for the nodes specified in the KEY attribute before the items can be retrieved.

The CURSORFOR attribute specifies a node reference with at least one wildcarded actual parameter, and thus evaluates to a value table. The values of the first wildcarded parameter column of the value table are used as menu items. Pulled propagation has to be performed for the nodes referenced in the CURSORFOR node reference before the items can be retrieved.

At Step 152, the end-user-entered (or menu-selected) value is encoded into an internal representation for values. If an illegal value is entered, it is rejected by the encode procedure, and control is returned to TOP.

At Step 160, the value of the node instance is updated. The node instance is computed from the SOURCE attribute of the box which specifies a node and in the case of a parameterized node, one or more selectors. The actual parameter values that fully specify the node instance correspond to the current values of the selectors. After updating the node instance, the procedure UPDATE INSTANCE VALUE, which is expanded in FIG. 18, constructs an interface record (an event) and merges it into the appropriate node-bucket of LOCAL-PROPAGATEARRAY (in the Anchor data structure). This array maintains the set of nodes that are relevant to the Current Form and for which propagation is still pending.

At Step 161, the mode is checked. In EVALUATE mode or when the MUSTPROPAGATE flag of the box is T, control is given to the Inference Engine. (FIG. 12, block 124) Otherwise control returns to the TOP.

The operation of the INFERENCE ENGINE will now be described with reference to FIGS. 16-20.

FIG. 16 illustrates local propagation. The local propagation process computes all values needed to make the current form consistent. The algorithm is optimized so that node instances are always cached and minimally recomputed.

At Step 164, a test is made to determine whether there are more instances to recompute. The local propagate array is scanned from level MAXLEVEL to 1 to see if the array element points to some EVENTNODE. If no EVENTNODE is found the local propagation is ready.

At Step 166, the inference engine picks the best instance to recompute from the local propagate array. It is the first instance of the first EVENTNODE found in the local propagate array with the highest level number. The best instance is then removed from the local propagate array.

At Step 167, the PROPAGATE INSTANCE subprocess computes new values for the instance and marks dependent instances for recomputation. This subprocess is illustrated in detail in FIG. 17. At Step 171, a test is made to determine whether this is a wildcard instance. If it is, then at Step 172 the wildcarded instance and existing value table are joined.

If the node instance pattern to be recomputed contains wildcards (&&) the system must go through all old instances of the node and match the pattern against them. Those instances matching will be candidates for modification or deletion. In addition the Inference Engine will construct new instances from the pattern and old instances.

At Step 173, a test is made to determine whether the instance is to be deleted. For every instance that is a candidate for being deleted the Inference Engine tests to see if the instance can be deleted. The idea of this test is that only such instances can exist that are supported by some instance of its arguments. The Inference Engine therefore has to go through the arguments of the node to see if there are no instances among the arguments supporting the deletion candidate instance. For example, assume the equations

| NETINCOME[YEAR] | ← | DIFFERENCE(INCOME [YEAR], COSTS[YEAR]) |
| INCOME[YEAR] | ← | VALUE( ) |
| COSTS[YEAR] | ← | VALUE( ) | where "VALUE" is the comptype for acquiring the value from the end user. Assume further that the end user has entered the following instances:

| YEAR | NETINCOME | YEAR | INCOME | YEAR | COSTS |
|---|---|---|---|---|---|
| 1981 | 1000 | 1981 | 1500 | 1981 | 500 |
| 1982 | NIL | 1982 | 2000 | | |

If the Inference Engine gets the assignment

INCOME[1981]=*DELETE* it will delete INCOME[1981], but cannot delete NETINCOME[1981], since it is still supported by the instance COSTS[1981]. On the other hand, if it gets the assignment

INCOME[1982]=*DELETE* it will also delete NETINCOME[1982] which will then be supported by neither INCOME nor COSTS.

At Step 174, the instance is marked for deletion by assigning the value "DELETE". If the instance is not to be deleted, then, at Step 175, the node instance value is computed. The comptype function is invoked to compute a new value of the instance. The parameter values of the instance will be pushed on a parameter binding stack before the comptype function is invoked. The lookup procedure for a parameter value always scans the parameter stack to get the current value of a parameter. Comptype functions may return any type of value, including NIL, exact values, distribution or even value tables.

The only comptypes returning value tables are such comptypes that generate more than one instance, i.e. comptypes INSTANTIATE, RELCOLVAL with parameter as argument, and ENUMERATE. Comptype INSTANTIATE is special in that it always recomputes the complete value table; for other comptypes the pattern specifying the node instance determines which instances to replace by the value table.

At Step 176, a test is made to determine whether the new value supported by priors. If the new value is equal to the prior distribution and the instances supporting the new value all have the value NIL then at block 177 the new value is changed to NIL. This ensures that instances supported by only unknown values are represented as unknown, i.e. the system can distinguish between a prior value and a value equal to the prior value. This is needed since values equal to priors are displayed by the form system while prior values normally are not. For example, assume the equations

| NETINCOME[YEAR] | ← | DIFFERENCE(INCOME [YEAR], |
|---|---|---|
| COSTS[YEAR]) | | |
| INCOME[YEAR] | ← | VALUE( ) |
| | | with PRIORDIST = 1000 exactly |
| COSTS[YEAR] | ← | VALUE( ) |
| | | with PRIORDIST = 100 exactly | so NETINCOME will have the computed prior distribution 900 exactly. Now assume that we have assigned

INCOME[1986] = 1100

COSTS[1986] = 200 then NETINCOME[1986] = 900 which is equal to the prior distribution; thus the value of the instance is 900 and will be displayed if the instance is connected to a form box.

Now assume that we assign

INCOME[1986] = NIL

COSTS[1986] = NIL i.e. there are both INCOME and COSTS for 1986, but we do not know their values, i.e. the end user has entered DONT-KNOW. In this case the comptype function will return 1000 − 100 = 900, which will be asserted as NIL and thus not displayed if the instance is connected to a form box.

At Step 178, the instance value is updated. Details of this procedure are shown in FIG. 18. Input to this process is a set of node instance assignments, e.g.

YEARSELECTOR = 1986

INCOME[1986] = 1234

COSTS[1986] = 34

When the end user enters values to Forms System boxes or when a case is loaded, it will generate one or several assignments as above that are sent to the Inference Engine. If an instance is to be deleted (e.g. if the end user has clicked "clear"), it is indicated with a special value, *DELETE*, e.g.:

INCOME[1987] = *DELETE*

There is a difference between the case where an instance exists and has the value NIL (end user clicked DONT-KNOW) and the case where the instance is to be deleted (end user clicked "clear" or "unoverride"). For example

INCOME[1986] = NIL means that there is an income for 1986 but we do not know its value.

INCOME[1986] = *DELETE* means that the income for 1986 is to be deleted. The difference between NIL and *DELETE* gets important if we want to look at the set of all years where NIL-valued instances are included but not the deleted ones.

Each new instance also have to have an associated "input status" that indicates the source of the value. The input status can be one of "i" (entered by end user through Forms System), "l" (loaded from business case), or "c" (computed by the propagation algorithm).

At Step 181, a test is performed to see if the new value is a value table. If the node assignment is a complete value table it means that a section of the value table of the node is to be replaced. For example, assume these update specifications:

INCOME[&&] = (VT (1986) 1234 (1987) 1235)

COSTS[A,&&] = (VT (A 1986) 8000 (A 1987) 9000)

In the first example, all instances of INCOME are to be replaced with a value table (VT) setting INCOME[1986] = 1234 and INCOME[1987] = 1235. In the second example the rows of COSTS where the first parameter is "A" is to be replaced with a value table setting COSTS[A,1986] = 8000 and COSTS[A,1987] = 9000.

In Step 182, obsolete instances are deleted. The system first has to go through all old instances of the node matching the assignment pattern ([&&] and [A,&&] in the example) but which are not present in the value table. For each such instance, the local propagation is called recursively with the new value set to *DELETE*.

In Step 183, new instances are asserted. For each instance of the new value table the local propagation process is called recursively to update the instance values of the new value table.

At Step 184, a test is made to determined whether there is a wildcard in the instance key. Updates containing wildcards in the key but that are not value tables are specially handled by recursive calls to the value table update procedure.

The wildcard update (Step 185) is illustrated by the following example:

INCOME[&&] = *DELETE*

COSTS[A,&&]=*DELETE*

TAXES[A,&&]=0

Here the Inference Engine will delete the instances matching the pattern by recursively calling the local propagation process for each instance matching the pattern with the new value equal to *DELETE*. In the third example the Inference Engine will then assert a partial instance where the wildcard is replaced with NIL, thus indicating that the TAXES are 0 for every instance where the first parameter equals "A".

At Step 186, a test is made for significant change. For each assignment, the Inference Engine will check to see if the same instance with the same value was asserted before. If there is no significant change, the procedure simply returns; otherwise the Inference Engine will perform certain actions, such as notifying the Forms System or computing those node instances which are supported by the significantly changed nod instance, as described below.

For example, assume the input assignments

INCOME[1986]=1234

INCOME[1986]=1234

The second assignment is the same as the first, and therefore in the second assignment there is no significant change, and thus no further database modification happens.

There is significant change if any of the following tests are met:
a. The instance did not exist before and the new value is not *DELETE*.
b. The instance existed before and the new value is *DELETE*.
c. The instance existed before and the new value is not equal to the old value. The threshold for equality of numbers is as small as possible depending on the precision of the machine representation. Equality of discrete distributions uses the maximum difference of cumulative distributions. Equality of normal distributions tests for equality of the mean and variance. Equality of strings compares strings character by character.
d. The input status is different. As described above, every value has an associated input status tag that tells how the value got computed.

If there is no significant change, the remaining steps are skipped for this assignment, and the next assignment is processed.

At Step 187, new instances are stored or deleted. If the new value is *DELETE*, the specified instance is deleted from the dynamic Knowledge Base. If the instance existed before, the old value is replaced with the new; otherwise a new instance is asserted to the dynamic Knowledge Base. The system also stores the input status with the instance.

At Step 188, connected form boxes are marked for refresh. In case there was significant change, the Inference Engine will go through all form boxes connected to the node and mark them as candidates for being refreshed by storing them in the Update Queue. The final decision whether they need to be refreshed or not is made by the Form System after the propagation is finished.

At Step 189, a check is made for ALERTS, DYNCLASS, and FORMTEXT changes. If the node is referenced as ALERTS, DYNCLASS, or FORMTEXT in some other node, the Inference Engine will check if there is need to refresh form boxes connected to those nodes. The node attributes ALERTSIN, DYNCLASSIN, and FORMTEXTIN points to lists of nodes where this is the case. The actual displaying of alert texts cannot be done until after a complete round of propagation, and is therefore made by the form refresh function looking for a "!" in annotations of boxes.

At Step 190, dependent instances are marked. This procedure is shown in detail in FIG. 19. The Inference Engine finds out which other node instances are affected by the change and adds those instances to a prioritized queue of node instances that need to be recomputed. Such a queue is called a propagation array. There are several such propagation arrays in the system; the main propagation algorithm uses two of them, the local and the global propagation arrays. The local propagation array is used if the node to be recomputed appears on the current form; otherwise the global array is used.

At Step 191, the lists of dependent ARCs are searched to find out which instances need to be recomputed. The inference engine goes through all nodes referring to the updated node by their arguments, and constructs a pattern describing the instances of the nodes above the updated node in the network that are supported by the updated instance. This is done by mapping through the two lists OUTARCS and ACTPARAMSIN. The rest of the instance propagation process is repeated for each such dependent ARC.

At Step 192, the key of the node instance to be recomputed is constructed given an ARC by substituting the parameters of the ARC. For example, in the equation

R[X,Y]←PLUS(S[Y,X], T[X], U, V[W])

the following instances of R need to be recomputed when an argument of R is updated:

| Update S[1,A]    | → | update instance [A,1] of R    |
| Update T[B]      | → | update instance [B,&&] of R   |
| Update U         | → | update instance [&&,&&] of R  |
| Update V[2]      | → | update instance [&&,&&] of R  |
| Update W         | → | update instance [&&,&&] of R  |
| Update S[1,NIL]  | → | update instance [&&,1] of R   |

When an asserted instance with a key containing a NIL (a partial instance) is accessed, the NIL behaves like a wildcard, and thus many keys match that instance. Since a NIL in the dynamic knowledge base corresponds to a wildcard in a pattern, NILs in the dependent key have to be replaced with wildcards.

At Step 193, a propagate array is chosen. When a node supports a value on the current form, it is said to propagate to the current form. If the attribute OUTNODE of the ARC propagates to the current form, the dependent key will be marked in the local propagate array, otherwise in the global one. The choice is made by testing whether the attribute PROPSTO of the OUTNODE has a reference to the current form's BOXDEF.

At Step 194, an EVENTNODE element is searched for. Using the level number of the OUTNODE as index in the propagate array chosen, the list of nodes marked for that level is searched for an EVENTNODE object referencing OUTNODE. If no EVENTNODE object is found a new one is added.

At Step 195, an EVENTKEY element is inserted. The attribute KEYSTOPROP of each EVENTKEY points to a balanced tree of the keys that are marked for recomputation for the EVENTNODE. The dependent key is added or replaced in that tree.

FIG. 20 illustrates pulled propagation. Pulled propagation is the process of extending the propagation to a node, N, outside the current form. Thus the propagation is said to be pulled to node N.

At Step 201, local propagation pulls everything to the current form. The pulled propagation algorithm require that everything is propagated to the current form, and thus the local propagate array is empty.

At Step 202, a test determines whether the node propagates to the current form. If the node propagates to the current form and thus cannot be marked in the global propagate array then we return immediately.

At Step 204, the arguments of node N are pulled. In order to pull a value to node N we first have to pull the value to the arguments of N. This is done by recursively repeating processes 202, 204, and 205 for each argument of N.

At Step 205, the global propagate array is searched for an instance of N marked for recomputation. The propagate instance procedure is applied to each such instance.

The operation of the Forms System for displaying output (FIG. 12, 126) will now be described. This procedure is the means by which the current form is updated.

Referring to FIG. 21, at step 211, the current form's data structures are updated. At step 212, those areas on the current form that have been invalidated are selectively cleared (erased), using the CLEAR QUEUE constructed during Step 211. At step 213, those areas of the form corresponding to parts of the form's data structures updated during the previous Steps are repainted, using the REFRESH QUEUE constructed during Step 211. If the box being displayed is a Group Object, this procedure is applied recursively to the list of boxes stored in the BOXES field of the box data structure. If the box is a Primitive Box, the box's "display data" fields (i.e., shade, outline, font, position, etc.) are used to place the contents of the BOXCONTENTS field in the region specified by the BOXREGION field. At step 214, any alerts to be fired as the result of previous steps are displayed on the alert 38. The ALERT QUEUE constructed during Step 211 is used to display (one at a time) on the alert 38 all alert messages that have been triggered as the result of the operation of the inference engine.

The UPDATE QUEUE maintained in the Anchor data structure is employed by the Inference Engine to communicate with the Forms System. It contains all the boxes that correspond to nodes in the Compiled Knowledge Base where values have changed since the last call to the Inference Engine. Only those boxes contained in the current form are included.

FIG. 22 illustrates the process for updating the forms data structures (211, FIG. 21) to reflect changes that have been posted by the Inference Engine in UPDATE QUEUE. This process terminates when the contents of UPDATE QUEUE are exhausted. It produces three queues, CLEAR QUEUE, REFRESH QUEUE, and ALERT QUEUE which are needed by the subsequent Steps 212, 213, and 214, respectively.

At Step 221, an object is retrieved from UPDATE QUEUE. The retrieved object is either a Primitive Box, a Group Object, or a Case Object. The object with the lowest box-level-number is considered first.

At Step 222, a test is made to determine whether the object is visible. An object is visible if all its parents in the box hierarchy of the current form are visible and if its own visibility condition (if any) is satisfied. The visibility condition is determined from its VISIBLE attribute. (See Glossary under VISIBLE on how visibility conditions are tested.) If the object is not visible, then at Step 223, a test determines whether the object was previously visible. If the object was previously visible, then at Step 224, the object's data structure is updated to reflect that the object is now invisible. If the object is a Group Object, all SFACTIVEREGIONS associated with this object are deleted from the list stored in the FORMACTIVEREGIONS field of the current form. A Case Object is treated as a Group Object for the Group Object currently shown (stored in the BOXCONTENTS attribute of the Case object). At Step 225, the object is inserted in the CLEAR QUEUE of objects to be erased.

If the test at Step 222 determines that the object is now visible, then, at Step 226, a test determines whether it was previously visible. If the object was not previously visible, then, at Step 227, the object's data structure is updated to reflect that the object is now visible. If the object is a Group Object, all SFACTIVEREGIONS associated with this object are merged with the list stored in the FORMACTIVEREGIONS field of the current form. A Case Object is treated as a Group Object for the Group Object currently shown (stored in the BOXCONTENTS attribute of the Case Object).

If the test at Step 226 indicates that the object was previously visible, then at Step 228, NEXTVAL is computed. This is the decoded (external) representation of the node instance value that corresponds to the node-ref stored in the SOURCE attribute of the box.

At Step 229, a test is performed to determine if CURRENTVAL, the current value stored in the BOXCONTENTS field of the object's data structure, is different from NEXTVAL, the updated value. If the value is changed, then, at Step 230, the BOXCONTENTS attribute is updated. If there is an ANNOTATIONVALUE field associated with the object and the new updated value of this field is different form its previous contents, Step 230 is performed, even though CURRENTVAL and NEXTVAL are the same. For a Group or Case object, NEXTVAL is a pointer to the group object (or NIL) which is going to replace the the group object (or NIL) CURRENTVAL.

At Step 231, the object is inserted in the REFRESH QUEUE to be redisplayed.

At Step 232, the object is removed from UPDATE QUEUE. For a Group or Case Object, all objects contained within the group are also removed from the UPDATE QUEUE because Step 230 will already have updated any visible boxes contained within the group.

FIG. 23 illustrates the details of the UPDATE BOX CONTENTS procedure (FIG. 22, 230). NEXTVAL is different from CURRENTVAL, the BOXCONTENTS field must be updated and the area corresponding to the box on the form must be cleared and refreshed in Steps 212 and 213, (FIG. 21), respectively.

At Step 241, a test is made to determine the boxtype. If the box is primitive (i.e., not a Group or Case Object), then at Step 242 the BOXCONTENTS field is updated and at Step 243 the ANNOTATIONVALUE fields of the box's data structure are updated. The values stored in these fields are the decoded representations that can subsequently be processed by the Forms System (i.e., strings). If the annotation string indicates that an alert has been triggered during the current round of propagation, then at Step 244 the triggered alerts are added to the ALERT QUEUE which will be used in Step 214. A freshly triggered alert can be determined from the annotation string itself because it will now contain an "!" that was not previously in the string.

If the test at Step 241 determines that the box is a Group or Case Object, then at Step 245 CURRENTVAL is tested. For a Case Object, CURRENTVAL (when non-NIL) is the Group Object that, because its visibility condition is satisfied, is currently displayed in the area of the form reserved for all alternative Group Objects associated with the Case Object. The alternative Group Objects are stored in the SOURCE attribute of the Case Object. If CURRENTVAL is NIL, nothing was displayed.

If CURRENTVAL is not nil, then, at Step 246 the Group Object currently displayed, CURRENTVAL, is invalidated. CURRENTVAL's data structure is updated to reflect that the Group Object (and all the boxes it contains) is now invisible. All SFACTIVEREGIONS associated with CURRENTVAL are deleted from the list stored in the FORMACTIVEREGIONS field of the current form. CURRENTVAL is inserted in the CLEAR QUEUE to be later erased in Step 212. CURRENTVAL is removed from UPDATE QUEUE as well as any boxes contained in CURRENTVAL that might still be waiting to be processed in Step 221.

At Step 247, NEXTVAL is stored in the BOXCONTENTS field of the box.

At Step 248, NEXTVAL is tested. NEXTVAL is a Group Object which is replacing CURRENTVAL. If NEXTVAL is not nil, then, at Step 249, NEXTVAL's data structure is updated to reflect that the Group Object is now visible. All SFACTIVEREGIONS associated with NEXTVAL are merged with those in the list stored in the FORMACTIVEREGIONS field of the current form. NEXTVAL is inserted in the REFRESH QUEUE to be later employed in Step 213 to redisplay the contents of the current form. Any boxes contained in NEXTVAL that are not already in the queue and that might also need to be refetched from the Compiled Knowledge Base are added to the UPDATE QUEUE (because even though their values might not have changed they might not have been visible until now).

The appendices attached hereto provide further details regarding this embodiment to aid in understanding the present invention. Appendix 1 is a glossary of general terms used in this embodiment. Appendix 2 is the Data Dictionary for the data elements in the record structures shown in FIGS. 8-11. Appendix 3 is an overview of the system described hereinabove.

While a particular embodiment of the invention has been described, it will be understood that the true scope of the invention is not limited by the particular embodiment disclosed. The true scope of the invention is defined by the appended claims.

APPENDIX 1

GLOSSARY OF GENERAL TERMS active-region
See mouse-sensitive region.
actual-parameter
A node used to determine the value of a parameter.

alert
A message that appears dynamically on a screen when (a) some condition defined in the knowledge base first becomes true, and (b) the screen displays the node with which the alert is associated.
annotation
A character (such as a letter or a punctuation mark) that appears next to a screen item to inform the end user about the item's status.
annotation-value
The particular annotation character displayed.
arc
A directed segment linking two nodes in a network. For parameterized arguments, arcs also contain information about actual parameters.
AVL-tree
A binary tree that includes in each node information that allows the tree to be kept in balance as entries are added or deleted, thereby maintaining logarithmic accessing time.
balanced-bottom-up-propagation
Bottom-up propagation in which the value of any node in a network is never computed more than once.
bottom-up-propagation
Propagation which proceeds from the input nodes towards the output nodes of a network.
box
A general screen object, usually corresponding to a rectangular region on the screen and its properties. (See also primitive box.)
box-level-number
Boxes are organized into a hierarchy that can be described as a tree. The level number of a box is the number of boxes on the path from the given box to the root of the tree. (See the BOXLEVELNUMBER attribute of BOXDEF in Appendix 2.)
categorized-class
A class having a finite number of identified, discrete values.
class
The type of a variable. Standard classes include INTEGER, NUMBER, LOGICAL, and STRING. Specialized classes (including symbolic nominal and ordinal classes) can be defined by knowledge engineers.
command-bar
A region common to all screens that is divided into mouse-sensitive primitive boxes, one for each of a set of standard commands. Clicking the mouse in one of these boxes causes execution of the corresponding command.
compiled-knowledge-base
The internal representation of a knowledge base. A knowledge-base compiler (not described in this patent) converts an external representation of the knowledge base written in a high-level language into into this internal representation.
comptype
One of the predefined functions that can be used to compute the value of a node from the values of its arguments.
control-flow
At any given time, only one procedure in the system is being executed, and that procedure is said to be "in control." Depending on the results of computations, control can flow from one procedure to another. A flowchart displays graphically all of the paths for this flow of control.

data-driven-system
: A system is said to be data-driven if the data source (e.g., the end user) can choose which inputs to provide, and the system merely determines the consequences of those input values. (See also goal-driven-system.)

dataflow
: Each procedure in a system draws upon its input data and creates its output data. The transfer of data among procedures is referred to as dataflow.

dataflow-diagram
: A usually hierarchical, graphical representation of all of the paths for the flow of data among procedures.

decode-function
: A procedure for converting the internal representation of the value of a variable to a string, which can be used for external display.

directed-network
: A network in which the directions of the paths between nodes are specified.

discrete-probability-distribution
: See probability-mass-function.

display-object
: See screen-object.

encode-function
: A procedure for testing the external string representation of the value of a variable for validity, and, if the value is valid, for converting it to its internal form.

end-user
: The person who runs the completed expert-system program.

equation-network
: A directed network corresponding to a set of equations. Nodes in the network correspond to variables in the equations; the arcs incident on a particular node specify the arguments from which the value of that node is computed.

escape-to-host-language
: A way for a programmer using high-level language to include a procedure written in the host-language, the language in which the interpreter or compiler for the high-level language is written.

evaluate-mode
: The condition of execution of the system in which the consequences of each data input are computed immediately after the data item is entered. (See input-mode.)

expert-system
: Computer programs that emulate reasoning tasks by applying the encoded knowledge of specialists ("experts") to facts about a specific problem that are supplied by the end user.

expert-system-shell
: An expert system from which the contents of the knowledge base have been removed.

form
: A screen object that corresponds to a complete screen.

form-index
: A menu that identifies all of the forms that the end user is allowed to see.

form-limited-propagation
: A mode of propagation in which the values of nodes are computed if and only if those nodes are displayed on the screen currently being viewed.

formal-parameter
: A parameter for a node when used in its definition.

forms-system
: That part of the system that provides the interface between the end user and the inference engine.

functional-language
: A computer language in which procedures return single values that are functions of the input arguments in the mathematical sense of the term, i.e., in which for every input in the domain there is exactly one output in the range.

global-propagation-array
: The propagation array for all of the variables in the equation network.

goal-driven-system
: A system is said to be goal driven if it actively seeks input data from the data source (i.e., the end user) because that requested data is relevant to achieving some identified purpose or goal. (See also data-driven-system).

group
: A collection of screen objects, plus properties common to those objects, such as an enclosing rectangular region of the screen.

host-language
: The computer language in which the interpreter or compiler of a high-level language is written.

immediate-value
: The value of a variable than can be obtained directly from a menu.

inference-engine
: That part of an expert system that computes the consequences of applying the knowledge encoded in the knowledge base to the input data provided by the end user.

inference-network
: See equation network.

input-mode
: The condition of execution of the system in which input data are collected, and their consequences are not determined until either (a) the end user requests evaluation, or (b) evaluation is required by the structure of the knowledge base. (See evaluate-mode.)

instance
: A particular row in the value table of a parameterized variable.

join
: A relational table formed from two other tables in which the columns of the output table are the union of the input-table columns; while information is usually represented redundantly in the result, no information is lost.

key
: A variable whose value is needed to retrieve a value from a table.

knowledge-base
: An encoded representation of human knowledge about a particular subject or domain. In SYNTEL, instead of using rules or frames, knowledge is encoded in the form of an equation network.

knowledge-engineer
: A programmer who encodes knowledge bases.

knowledge-representation
: A formal expression of knowledge in which symbolic expressions (which are typically parts of either procedural or nonprocedural computer programs) allow important consequences of that knowledge to be mechanically deduced.

level-number

The number of nodes on the longest path from a given node to a root node.

local-propagation-array
The propagation array for just those variables in the equation network that are important for the currently visible form.

mean
The average or expected value of a probability distribution.

menu
A set of choices given to the end user.

meter
A graphical representation of a probability distribution in which shaded bars correspond to percentile intervals of the distribution.

model
A collection of nodes sharing the same name space.

mouse
A hand-held device that allows the end user to point to items on the cathode-ray-tube screen, and to make menu selections by clicking a mouse button.

mouse-button
A key switch on a mouse.

mouse-sensitive-region
A rectangular area on the cathode-ray-tube screen within which the program will respond when the end user clicks a mouse button.

name-space
A set of possible values of names for computational objects, such as variables.

NIL
A special value that signifies that a variable is undefined or that no parameter instance exists.

node
A primitive object in a network.

node-instance-assignment
The association of a value to a particular instance of a variable.

node-level-number
From any node in an equation network one can follow a path along the arcs to one or more root nodes. The node-level number is the number of nodes encountered on the longest such path.

node-reference
The name of a node together with all of its actual parameters, if any.

nonprocedural-representation
A static representation of knowledge in terms of the factual relations among objects, rather than in terms of how information is to be determined.

normal-probability-distribution
Also known as a gaussian distribution. A classical probability density function that is an exponential function of a quadratic function of its variable. A normal distribution is completely determined by its mean and its variance.

override
The act of replacing a value determined by the inference engine by a value chosen by the end user.

parameter
A key that identifies a particular instance of a parameterized variable.

parameter-instance
A particular value for a parameter in a value table.

parameterized-variable
A variable with many possible values, the particular value being determined by the values of its keys or parameters.

primitive-box
An elementary screen object, which is typically either a text string or a rectangular area on a screen in which input or output data can appear.

prior-distribution
A probability distribution that is used when no other information about the value of a node is known.

probability-density-function
A mathematical function of a variable whose integral over any given region is the probability that the variable lies in the given region.

probability-distribution
A probability mass function or a probability density function.

probability-mass-function
A set of probability values, one for each of the possible discrete values of a variable, where the sum of all of the probability values is unity.

procedural-escape
A way for a programmer using a nonprocedural high-level language to determine information through use of a procedure.

procedural-representation
A dynamic representation of knowledge in terms of algorithms that specify how information is to be determined.

prompt-area
The region on a screen in which the end user is asked to provide information, and in which his or her keyboard typein appears.

propagation
The process of repeatedly recomputing the values of dependent nodes as a consequence of changes to the values of independent nodes.

propagation-array
A dynamic data structure holding the nodes indexed by node-level-number whose changed values may require recomputing the values of other nodes in the equation network.

relational-database
A database in which factual data are stored in one or more tables of values of attributes.

relational-tables
A table whose columns correspond to the attributes of objects, real or abstract. Each row is unique, and corresponds to a particular instance of an object having that set of attribute values.

root-node
A node with no outgoing arcs.

run-time
The time when the end user is using the system.

run-time-system
That part of the total system that must be present when the end user is using the system.

screen
A set of items as displayed by the computer on a cathode-ray-tube. The end user typically thinks of a screen as the electronic equivalent of one of many pages that might be found in a collection of printed business forms.

screen-object
Either a primitive screen object (such as a string of text or a primitive box), or a collection of screen objects.

selector
A node whose value is used to identify a parameter value.

self-referencing-node

A parameterized node for which the value of one instance depends on the values of predecessor instances for the same node.

side-effects
Changes in the values of variables (usually caused indirectly by some procedure) for which the source of the change cannot be determined. The results produced by programs with side effects frequently depend on the time sequence in which input values were provided.

simple-node
A node with no parameters.

standard-deviation
The square root of the variance of a distribution.

source
The node that accepts input data from a box or provides output data to a box.

Syntel
The complete programming system, comprised of a high-level, nonprocedural language in which the knowledge-base for the system is expressed, the development system, and the runtime environment.

update-queue
A queue of screen objects whose contents have changed, and thus may, in turn, causechanges to the values of other nodes in the equation network.

value-table
A table of the possible values for a parameterized variable. A value table is keyed by the parameters; its one non-key column is the value of the node.

variance
The average or expected value of the square of the difference between a random variable and its mean.

visibility-condition
A logical condition that controls whether or not a screen object will be displayed to the end user.

visible-screen-object
A screen object whose visibility condition is satisfied.

wildcard
In parameter specification, the special symbol "&&" which indicates that all parameter instances are to be used. In string matching, the special symbol "*" which matches zero or more successive characters.

&&
The special wildcard symbol for parameter specification.

*DELETE*
A special value associated with a variable indicating that the current instance of the variable is to be deleted.

APPENDIX 2

DATA DICTIONARY FOR THE DATA STRUCTURE ATTRIBUTES

This appendix is a data dictionary for the data elements in the 14 record structures shown in FIGS. 8–11. The fields (attributes) are listed in alphabetical order within a record, and the records are listed in the following alphabetical order:
1. ANCHOR
2. ARC
3. BOXARRAY
4. BOXDEF
5. CLASS
6. EVENTARRAY
7. EVENTKEY
8. EVENTNODE
9. MODEL
10. NODE
11. PARAMCOMB
12. PARAMCOMBTABLE
13. SFACTIVEREGIONS
14. VALUETABLE ANCHOR Attributes

ALERT-QUEUE

A list of alerts (strings) that have been triggered during a round of propagation and must be displayed in the alert area.

CLASSES

Points to a list of all CLASSes in the knowledge base.

CLEAR-QUEUE

A BOXARRAY containing all the screen objects that must be cleared after a round of propagation.

COVERFORM

The top form in the form hierarchy. It is the first form that the end user sees.

CURRRENT-FORM

Points to the BOXDEF of type FORM representing the currently displayed form.

FORM-PATH

Points to a list of forms on the path from the coverform to the current form.

GLOBAL-PROPAGATEARRAY

Points to the global propagate array

LOCAL-PROPAGATEARRAY

Points to the local propagate array

MODELS

Points to a list of all MODELs in the knowledge base.

REFRESH-QUEUE

A BOXARRAY containing all the screen objects that must be refreshed after a round of propagation.

UPDATE-QUEUE

A BOXARRAY containing all the screen objects that must be updated after a round of propagation.

ARC Attributes

ACTPARAMS

Pointer to list of actual parameters represented as a PARAMCOMBTBL. The lists are unique.

INNODE

Pointer to the node where the ARC is member of INARCS.

OUTNODE

Pointer to node where ARC is member of OUTARCS.

TRANSTABLE

Interpolation table for comptype WEIGHT.

BOXARRAY Attributes

MAXBOXLEVELNUMBER

The largest box-level-number.

BOXES

A list of boxes having the same level number.

BOXDEF Attributes

ACTIVEREGIONS

A list of pointers to SFACTIVEREGION records that describe sensitive regions within a Group Object. Each record associates a From region with the corresponding BOXDEF data structure and the procedure to be applied to the BOXDEF when the end user selects the region with a mouse click. The list is computed at compile time.

ANNOTATIONVALUE

A three character string containing one of the following characters: "i", "o", "!", "*". It is displayed to the right of the associated box.

"i"—indicates that the value has been entered by the end user.

"o"—indicates the end user has overridden the value computed by the system. ("i" and "o" are mutually exclusive).

"!"—indicates an alert has been triggered and is attached to this box for the end user's examination.

"*"—Indicates a footnote is attached to this box.

BOXCONTENTS

If the box is a primitive box, the BOXCONTENTS attribute is a string. If the SOURCE attribute contains a node-ref, the string corresponds to the decoded (external) representation of the value stored in the Compiled Knowledge Base with the corresponding node instance. The SOURCEPROP attribute will determine what type of value is shown in the box. If the box is a Group Object, the BOXCONTENTS field is a pointer to the group itself (copied from the SOURCE attribute) if visible. If the box is a Case Object, this field contains the Group Object that is currently visible from the set of possible alternative Group Objects specified in the SOURCE attribute. A NIL value for this attribute indicates that the screen region reserved to display the contents of this object is blank.

BOXES

A list of box pointers corresponding to the set of boxes contained in a Group Object with BOXLEVEL-NUMBER one more than that of the Group Object. For instance, in FIG. 3, G1's BOXES attribute will be (C1 G5 PB5).

BOXLEVELNUMBER

An integer. The box-level-number of a box is determined from the box's nesting in the box hierarchy of each form. The lowest box-level-number, 1, is assigned to the form itself. The box-level-number of any box contained in the BOXES field of a Group Object or a Case Object, is one more than that of the object itself. Thus, for example, in FIG. 3, the form F1 has level 1. The Group Object G1 and the two primitive boxes PB6 and PB7 are contained in F1 and therefore are of level 2. Similarly, the Case Object C1, the Group Object G5 and the primitive box PB5, are of level 3. Each of the alternative Group Objects G2, G3, and G4 that comprise the Case Object C1, as well as the primitive boxes PB3 and PB4, are of level 4. Finally, the primitive boxes PB1 and PB2 are of level 5.

BOXREGION

A FORM-REGION record: (left, bottom, width, height) specifying a region's coordinates in pixels relative to the screen coordinates of the region occupied by the entire form.

BOXTYPE

When present, it is one of the keywords GROUP, CASES, or FORM indicating that the BOXDEF record is a Group Object, Case Object, or a Form respectively. When omitted, the box is a primitive box. If GROUP is specified, the group attribute BOXES and ACTIVEREGIONS described below can be supplied as well. If FORM is specified, the form attributes SUBFORMS, TITLE, and FORMACTIVEREGIONS can be specified in addition to BOXES and ACTIVEREGIONS (because a FORM is a special case of a Group Object).

FONT

Keyword specifying font to use to print contents of box.

FORMACTIVEREGIONS

A list of pointers to SFACTIVEREGION records. This is a dynamic list computed by merging all the SFACTIVEREGION records contained in the ACTIVEREGIONS attribute of the screen objects currently visible on the form.

MUSTPROPAGATE

A flag (T or NIL) computed during compile-time analysis to indicate that whenever a value is entered for this box in INPUT mode, it must be propagated immediately, otherwise the data shown on the form is invalid and subsequently collected input might be rejected or irrelevant.

NOWVISIBLE

A flag (T or NIL). Whenever a box with a non-NIL VISIBLE attribute becomes visible, this flag is set to T. It is set to NIL when the box becomes invisible.

OUTLINE

A keyword specifying how the region given in the BOXREGION field is framed. Default is no frame. BOX indicates a framed box. UNDERLINE indicates that the box contents are to be underlined.

PARENTGROUP

Upward pointer to Group Object containing this box. The PARENTGROUP of a box that corresponds to a FORM is NIL.

POSITION

Keyword specifying placement of box contents relative to frame of box region.

REFRESHFN

A procedure (function name) to be employed to display the data stored in the BOXCONTENTS field. Since most box contents are strings, this is often omitted and a default system print function is used, that takes into account the other display data attributes (BOXREGION, SHADE, OUTLINE, FONT, POSITION).

SHADE

An integer, corresponding to a shade texture representation to be employed for the background shade of the box. Default is white.

SOURCE

If the box is a primitive box, the SOURCE attribute can be a string, a number or a node-ref. If it is a node-ref, it specifies the node instance in the Compiled Knowledge Base from which the value displayed in the box is fetched. If the node specified in the node-ref is parameterized, one or more selector nodes is included in the node-ref and are used as actual parameter values to fully specify the node instance for which the value is to be fetched. Typically, a box will be included in a form for each selector node. At compile time the box is linked to all the nodes comprised in the node-ref (the box is added to the SFBOXES attribute of each of the nodes). This enables the Inference Engine to know which boxes might need to be redisplayed as a result of a value change during propagation.

If the box is a Group Object, this attribute is a pointer to the Group Object itself. If the box is a Case Object, this attribute is a list of Group Objects that are the alternative Objects that can be displayed in the screen area reserved for the Cases Object.

SOURCEPROP

A keyword controlling how the internal value of the object specified by SOURCE will appear in the box. For primitive boxes linked to the Compiled Knowledge Base through their SOURCE attribute, the keywords are:

NOPRIORVALUE—display only if not prior value
CURRENTVALUE—display under all conditions
UNOVERRIDDEN—display the computed value, even if overridden

SUBFORMS

A list of FORMs that are the descendents of this form in the Form Hierarchy. It is employed by procedures that execute Form Commands such as SCREEN-INDEX, FORM-IDDEX, TABLE-OF-CONTENTS, NEXT-SCREEN, and PREVIOUS-SCREEN.

SYNTELFORM

Pointer to the FORM that contains the box.

TITLE

String to be used constructing form index menus.

VISIBLE

A node-ref. It corresponds to the condition that must be satisfied for the box to be displayed on a form. If the node-ref's class is LOGICAL, the VISIBLELIMIT attribute specifies the probability threshold that must be attained by the condition node to render the box visible. Boxes with VISIBLE attributes are linked at compile time with the condition nodes in the same manner as the node-ref specified in the box's SOURCE attribute so that, whenever the value of the condition node changes during propagation, the Forms System can be instructed to update and (redisplay) the affected boxes.

If the BOXTYPE attribute is FORM, the node-ref is the condition that must be satisfied for the form to be visible (e.g., to be included in a SCREEN-INDEX menu). Under certain circumstances, the value of a visibility condition must be "pulled" from the Compiled Knowledge Base rather than communicated to the Forms System by propagation. This occurs for instance when the end user requests a SCREEN-INDEX and visibility conditions associated with forms must be checked before the index menu is constructed.

VISIBLELIMIT

A probability. (See also VISIBLE).

CLASS Attributes

CATEGORIES

The different possible values (categories) of the class.

CLASSNAME

The name of the class as a string.

DECODEFN

The name of the decode function for the class

ENCODEFN

The name of the encode function for the class

IS-A

Pointer to superclass of the class

SCALETYPE

The scale type of the class: NOMINAL, ORDINAL, or INTERVAL.

EVENTARRAY Attributes

MAXLEVEL

The node with the highest level number propagated so far.

NODEBUCKETS

Array of data structures describing node instances marked for propagation. The data structures are indexed by the level numbers of the marked nodes.

EVENTKEY Attributes

BALANCE

−1 left heavy, 0 balanced, +1 right heavy

KEY

Pointer to node key represented as PARAMCOMB

LEFT

Pointer to left subtree of the AVL tree

RIGHT

Pointer to right subtree of the AVL tree

EVENTNODE Attributes

KEYSTOPROP

Pointer to an AVL tree holding the instances marked for propagation.

NEXT

Pointer to next EVENTNODE having the same level number.

NODE

Pointer to a node that has instances marked for propagation.

MATCHREL Attributes

COLUMN
The column of the relation from which the items are retrieved.

KEY
Nodes evaluating to as key of the relation restricting the rows to retrieve.

RELATION
The name of the relation from which the items are retrieved.

MODEL Attributes

ENTRIES
The number of entries in the node hash table of the model.

NAME
The name of the model as a string

NODEBUCKET
A hash table of NODEs of the model. Each entry of the hash table contains a list of nodes whose names are hashed to the same address.

NODE Attributes

ACTPARAMSIN
List of arcs where the node is used as actual parameter. Used by interpreter to figure out dependencies when a selector changes.

ALERTS
The alerts of the node.

ALERTSIN
List of nodes where the node is used as ALERT.

CLASS
Pointer to the CLASS of the node.

COMPTYPE
The comptype of the node.

CURSORFOR
A node reference with at least one wildcarded actual parameter. The values of the first wildcarded parameter of the resulting value table are retrieved as selection items.

DEPENDSON
Pointer to data structure, PARAMCOMBTBL, describing the actual parameters of the node. Nodes with same parameter combinations share the same PARAMCOMBTBL object.

DYNCLASS
The dynamic class of the node.

DYNCLASSIN
List of nodes where the node is used as DYNCLASS.

FORMTEXT
The dynamic form text of the node.

FORMTEXTIN
List of nodes where the node is used as FORMTEXT.

INARCS
Points to arguments of node as list of ARCs.

LEVEL
Stores node's level number as max distance to a root node.

MATCHRELATION
Points to a record structure, MATCHREL, describing how to retrieve the menu choices from a Relation for the user commands "Find" and "Select".

MODEL
Pointer to the MODEL of the node.

NAME
The name of the node as a string.

NEXTNODE
Pointer to the next node with the same hash address.

OUTARCS
Points to ARCs referencing the node by attribute INNODE.

PRIORDIST
Stores propagated prior distribution of node. The prior distributions are propagated by the Knowledge Base compiler.

PROPSTO
List of BOXDEFs of type FORM which are supported by the node.

SFBOXES
List of BOXDEFs connected to the node.
Inverse pointers to BOXDEF attributes SOURCE and VISIBLE.

VALUETABLE
Pointer to the node's value table holding its current instances.

NODEREF Attributes

NEXT
Pointer to the tail of the node-reference list.

NODE
Pointer to a node in the node-reference list.

PARAMCOMB Attributes

BALANCE
−1 left heavy, 0 balanced, +1 right heavy

KEYVALUES
The values of the key

LEFT
Pointer to left subtree of the AVL tree

REFCNT
Reference counter to be used when deleting the key.

RIGHT

Pointer to right subtree of the AVL tree

PARAMCOMBTBL Attributes

ARITY

The length of the list PARAMCOMB.

PARAMCOMB

Pointer to list of nodes describing the parameter combination.

PARAMVALUES

Pointer to keys instantiated so far for the parameter combination.

SFACTIVEREGION Attributes

ACTION

The name of a procedure to be applied to DATA when a mouse click is detected on REGION.

DATA

A pointer to a BOXDEF data structure that is associated with the Form region indicated in the REGION field.

REGION

A FORM-REGION record. (See BOXREGION).

VALUETABLE Attributes

BALANCE

−1 left heavy, 0 balanced, +1 right heavy

INPUTSTATUS

The input status of the instance. "i" or "1" or "c".

LEFT

Pointer to left subtree of the AVL tree

RIGHT

Pointer to right subtree of the AVL tree

ROWKEY

Pointer to unique key represented as PARAMCOMB.

ROWVALUE

The value of the instance.

What is claimed is:

1. An expert system shell comprising:
   (a) a computer having a display device, an entry device, and a memory for string a knowledge base; said knowledge base comprising:
      (1) variables having values represented by tables of probabitlity distributions keyed by zero, one or more formal parameters;
      (2) functions defining relationships between the values of each dependent variable and the values of its corresponding argument variables;
      (3) means for computing the probability distribution of the values of a dependent variable from the probability distribution of the values of the corresponding argument variables; and
   (b) means for propagating the consequences of a change in the value of a variable to maintain the functional relationships among a selected subset of the dependent variables.

2. The system of claim I further comprising means for creating and deleting instances of variables, either statically at compile time or dynamcially at run time.

3. The system of claim 1 further comprising means for recording the types of variables in the knowledge base, including both numeric and symbolic types, means for automatically generating menus for variables selected with a pointing device, means for performing validity checks on variables entered via a keyboard, and means for converting formats into standard formats.

4. The system of claim 1 further comprising means for automatically generating menus for allowing the end user to see all the existing instances of a variable at runtime and means for allowing the end user to see subsets of the full menu by using a wildcard matching procedure.

5. The system of claim 1 further comprising means for identifying a variable in the knowledge base uniquely by name, said identifying means including means for segmenting the knowledge base into modules, so that variables in different modules can have the same name, thereby simplifying the creation of a knowledge base by different knowledge engineers.

6. The system of claim 1 further comprising means for displaying the uncertainty in and the expected value of any variable.

7. The system of claim 1 wherein said functions comprise a system-provided family of primitive functions, functions specifying the dependence of an instance of a parameterized variable upon other predecessor instances of that same variable, as well as upon other variables.

8. The system of claim 1 said functions comprising a coherent system-provided family of functions, including functions for (a) arithmetic operations, (b) logical operations, (c) string operations, (d) selection operations, (e) value translation or combination operations, (f) external relation operations, and (g) variable state determination.

9. The system of claim 1, said propagating means further comprising means for minimizing the computation required during propagation by assuring that the final distributions for all arguments to a function are known before the distribution for the dependent variable is computed.

10. The system of claim 1 further comprising means for assuring that the visible values or distributions of values computed for any variable depend only on the values or distributions of values of the input variables, and are completely independent of the time sequence in which the inputs are entered.

11. The system of claim 1 further comprising means for saving all data entered by the end user on a computer file, means for loading that data, and means for ensuring that the system will produce the same outputs regardless of the sequence in which the data had originally been entered.

12. The system of claim 1 further comprising means for specifying either undefined or specific prior distributions for any variable, and means for displaying or suppressing the display of the distribution of a variable when it is the same as the prior distribution.

13. The system of claim 1 further comprising an interface between an end user and the variables in the knowledge base, said interface comprising:

means for allowing the end user to override the computed value of a dependent variable; and means for restoring the overridden variable to its unoverridden state.

14. The system of claim 13, said interface further comprising means for specifying a variable as nonoverrideable.

15. The system of claim 1 further comprising means for having more than one type of probability distribution for the values of a variable, with the ability for the distribution type to change dynamically at run time.

16. The system of claim 1 wherein said variables may be numeric or symbolic.

17. The system of claim 1 further comprising an interface between an end user and the variables in the knowledge base, said interface comprising:

means for specifying a set of display screens accessible to the end user as a function of the states of certain variables in the knowledge base.

18. The system of claim 17, said propagating means comprising means for minimizing the computation required during propagation by limiting the propagation to the subset of the dependent variables that are displayed to the end user.

19. The system of claim 18, said propagating means further comprising means for forcing propagation to extend beyond the displayed subset of dependent variables.

20. The system of claim 17 further comprising means for specifying special messages and the knowledge base conditions under which these special messages will be presented to an end user.

21. The system of claim 17 further comprising means responsive to an end-user request for clarifying the meaning of any displayed variable.

22. The system of claim 17, said interface further comprising means for specifying the layout, contents and appearance of each of the specified screens as a function of the states of specified variables in the knowledge base.

23. The system of claim 22, said interface further comprising means for specifying a set of variables whose values are displayed to the end user on said specified screens.

24. The system of claim 23, said interface further comprising means for specifying a set of variables whose values can be entered or changed by the end user.

25. The system of claim 24 said interface further comprising:

means for allowing the end user to override the computed value of a dependent variable; and means for restoring the overridden variable to its unoverridden state.

26. The system of claim 25, said interface further comprising means for specifying a variable as nonoverridable.

27. An expert system shell comprising:
(a) a computer having a memory for storing a knowledge base, display means for displaying data, and entry means for entering data;
said knowledge base comprising:
 (1) variables having a values represented by tables of probability distributions keyed by zero, one or more formal parameters;
 (2) functions defining relationships between the values of each dependent variable and the values of its corresponding argument variables; and
 (3) means for computing the probability distribution of the values of a dependent variable from the probability distribution of the values of the corresponding argument variables;
(b) means for propagating the consequences of a change in the value of any variable to maintain the defined functional relationships among a selected subset of the dependent variables; and
(c) an interface between the end user and the variables in the knowledge base, said interface comprising:
 (1) means for allowing the end user to override the computed values of a dependent variable;
 (2) means for restoring the overridden variable to its unoverridden state;
 (3) means for specifying a set of screens accessible to the end user, and the layout, contents and appearance of the specified screens, as a function of the states of certain variables in the knowledge base;
 (4) means for specifying a set of variables whose values are displayed to the end user on said specified screens; and
 (5) means for specifying a set of variables whose values can be entered or changed by the end user.

28. The system of claim 27, said propagating means comprising means for limiting the propagation to the subset of the dependent variables that are displayed to the end user, thereby minimizing the computation required during propagation.

29. The system of claim 28, said propagating means further comprising means for forcing propagation to extend beyond the displayed subset of dependent variables.

30. The system of claim 27, said interface further comprising means for specifying a variable as nonoverridable.

31. The system of claim 27 whereas said variables may be numeric or symbolic.

* * * * *